United States Patent
Kobori et al.

(10) Patent No.: US 8,002,414 B2
(45) Date of Patent: Aug. 23, 2011

(54) IMAGE DISPLAYING APPARATUS, AND A METHOD FOR ADJUSTING VIBRATING CONDITION OF A REFLECTION MIRROR IN THE IMAGE DISPLAYING APPARATUS

(75) Inventors: Tomoki Kobori, Kamakura (JP); Satoshi Ouchi, Kamakura (JP); Koji Hirata, Yokohama (JP); Hidehiro Ikeda, Yokohama (JP); Seiji Murata, Yokohama (JP); Kazuo Shikita, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 340 days.

(21) Appl. No.: 12/169,682

(22) Filed: Jul. 9, 2008

(65) Prior Publication Data

US 2009/0059179 A1  Mar. 5, 2009

(30) Foreign Application Priority Data

Aug. 30, 2007 (JP) ................................. 2007-223752

(51) Int. Cl.
 *G03B 21/16* (2006.01)
(52) U.S. Cl. ...................................... 353/52; 359/199.1
(58) Field of Classification Search .................... 353/52; 359/199.1
See application file for complete search history.

(56) References Cited

U.S. PATENT DOCUMENTS

| | | | |
|---|---|---|---|
| 7,697,180 B2 * | 4/2010 | Nakajima | 359/199.1 |
| 2006/0164710 A1 * | 7/2006 | Fujii et al. | 359/224 |
| 2006/0245009 A1 * | 11/2006 | Akiyama et al. | 358/474 |
| 2008/0055689 A1 * | 3/2008 | Mochizuki | 359/199 |

FOREIGN PATENT DOCUMENTS

JP  2006-343397  12/2006

OTHER PUBLICATIONS

Greg Niven et al, Trends in Laser Light Sources for Projection Display, IDW' 06, pp. 1939-1942, 2006.

\* cited by examiner

*Primary Examiner* — Seung C Sohn
(74) *Attorney, Agent, or Firm* — Antonelli, Terry, Stout & Kraus, LLP.

(57) ABSTRACT

For enabling to prevent ill effects from being generated in the structures of a reflection mirror, even if increasing an output energy from a light source, thereby preventing ill influences from being exerted on the driving condition thereof, a mirror drive controller unit 7 reads out history data of the past, relating to temperature changes on a micro mirror 1, from a first LUT holder unit 19. Upon basis of the read-out history data of the past is presumed the temperature on the micro mirror 1 at the present time. The presumed temperature on the micro mirror 1 is temperature P temp of the micro mirror 1 at the present time, and upon that P temp are changed vibration (or oscillation) condition of the micro mirror 1 in the horizontal (H) direction and vibration (or oscillation) condition thereof in the vertical (V) direction.

14 Claims, 9 Drawing Sheets

IMAGE DISPLAYING APPARATUS, AND A METHOD FOR ADJUSTING VIBRATING CONDITION OF A REFLECTION MIRROR IN THE IMAGE DISPLAYING APPARATUS

BACKGROUND OF THE INVENTION

1. Field of the Invention

The present invention relates to an image displaying apparatus, comprising therein a reflection mirror for displaying an object to be projected by receiving and reflecting a light irradiated from a light source into a predetermined direction, and a method for adjusting vibrating condition of the reflection mirror in the image displaying apparatus.

2. Related Art

In recent years are tried applications of technologies, such as, MEMS (Micro Electro Mechanical System) and a semiconductor laser technology, into household electric appliances. As an example of that can be listed up an application into an image displaying apparatus, for drawing an image thereon, with using a laser light made of wavelength components of visible lights, as a light source thereof (for example, see the following Non-Patent Document 1). Also, within an image displaying apparatus, comprising therein MEMS resonance mirrors is made a proposal of generating an image through raster scanning of a laser light, by means of that MEMS resonance mirrors, for a purpose of equalizing the brightness of the image projected on a screen. In that proposal, when conducting a laser scanning while outputting each pixel image data of three (3) primary colors, R, G and B, an adjustment is made on the intensity or strength of emission of the laser light depending upon speed change of the raster scanning in the horizontal direction, thereby obtaining an even or uniform brightness on the screen at each of bright spots (for example, see the following Non-Patent Document 1).

[Patent Document 1] Japanese Patent laying-Open No. 2006-343397 (2006); and

[Non-Patent Document 1] Trends in Laser Light Sources for Projection Display (IDW '06 1939-1942 (page 1939, FIG. 2).

SUMMARY OF THE INVENTION

By the way, with the image displaying apparatus comprising therein the MEMS resonance mirrors, being pivotally supported so as to swing, freely, into the vertical direction and the horizontal direction, it is possible to achieve an increase of color reproduction region and/or a high brightness, with a relatively low cost and with ease, in particular, upon the image formed on the screen, by projecting the laser beam lights emitted from the light source and reflected upon the MEMS resonance mirrors. This is due to the fact that, accompanying an advancement of the semiconductor laser technology in recent years, it is possible to achieve an increase of output energy from the laser light source and/or an increase of an efficiency in electric/photo conversion, and that it is also possible to achieve an increase in selectivity of oscillation wavelengths within the visible lights.

However, in general, the reflectivity of the laser beam lights upon the reflection mirror (i.e., the MEMS resonance mirrors) is 90% or more or less than that, approximately, within a range of the visible light wavelengths, and components of the remaining 10% of the laser beam lights, which are not reflected upon, are absorbed in the MEMS resonance mirrors, and almost of them are converted into heats on the MEMS resonance mirrors. For this reason, if increasing the output energy from the laser light source, in order to achieve the high brightness of an image or picture projected on the screen, then an amount of heats on the MEMS resonance mirrors is increased, thereby rising up temperature of the MEMS resonance mirrors; i.e., due to this, there is a possibility of generating various ill effects on the structures of the MEMS resonance mirrors. In addition to that mentioned above, there is also a possibility of bringing about an ill influence upon swinging condition of the MEMS resonance mirrors, which are pivotally supported so as to swing, freely, into the vertical direction and the horizontal direction. Therefore, with the conventional image displaying apparatus, actually, it is impossible to achieve the high brightness of the projection image formed on the screen, by increasing the output energy from the laser light source.

Accordingly, an object of the present invention is to provide an image displaying apparatus, comprising there in reflection mirrors, which can vibrate in one (1) axial direction or two (2) axial directions, wherein the structures of reflection mirrors thereof can be protected from being affected with ill influences applied thereupon, even if increasing the output energy from the light source for achieving the high brightness of the projection image.

An image displaying apparatus, provided according to a first aspect of the present invention, comprises: a reflection mirror, which is configured to display an image on a projection object, upon receiving a light irradiated from a light source thereon, to reflect it into a predetermined direction; a reflection mirror vibrating mechanism, which is configured to vibrate said reflection mirror into a predetermined direction; a temperature presuming unit, which is configured to presume temperature on said reflection mirror, depending on driving condition of said light source; and a vibration condition adjusting unit, which is configured to adjust condition of the vibration of said reflection mirror by said reflection mirror vibrating mechanism, to be corresponding to the temperature on said reflection mirror, which is presumed within said temperature presuming unit.

According to a preferable embodiment of the present invention, according to the first aspect thereof, said reflection mirror vibrating mechanism comprises: a first vibration mechanism, which is configured to vibrate said reflection mirror in a first axial direction; and a second vibration mechanism, which is configured to vibrate said reflection mirror in a second axial direction, perpendicular to said first axial direction.

According to other embodiment differing from the above, said temperature presuming unit presumes the temperature on said reflection mirror, upon basis of accumulated value data of a light amount irradiated from said light source, per every predetermined time-period.

Also, according to other embodiment differing from the above, said vibration condition adjusting unit adjusts vibration amplitude, vibration frequency, or vibration phase of said reflection mirror by said reflection mirror vibrating mechanism, to be corresponding to the temperature on said reflection mirror, which is presumed within said temperature presuming unit, appropriately.

Further, according to other embodiment differing from the above, the adjustment upon the vibration condition of said reflection mirror, which is conducted by said vibration condition adjusting unit, is conducted such that a locus of the light reflected through said reflection mirror on said projection object is in conformity with an ideal condition of the locus of said light on said projection object.

An image displaying apparatus, provided according to a second aspect of the present invention, comprises: a reflection mirror, which is configured to display an image on a projection object, upon receiving a light irradiated from a light source thereon, to reflect it into a predetermined direction; a reflection mirror vibrating mechanism, which is configured to vibrate said reflection mirror into a predetermined direction; a photo detector unit, which is configured to output a predetermined electric signal, after detecting a light incident upon said projection object through said reflection mirror; a vibration condition detector unit, which is configured to detect a vibration condition of said reflection mirror, upon basis of the electric signal outputted from said photo detector unit; and a controller unit, which is configured to control said reflection mirror vibrating mechanism, so as to bring the vibration condition of said reflection mirror into a desired vibration condition, upon basis of the vibration condition of said reflection mirror, which is detected by said vibration condition detector unit.

According to a preferable embodiment of the second aspect of the present invention, said vibration condition detector unit detects vibration amplitude, vibration frequency, or vibration phase of said reflection mirror, which are obtained by measuring a distance between the electric signals outputted from said photo detector unit.

Also, according to other embodiment differing from the above, said photo detector unit comprises: a photo transmitting member, which is disposed in said projection object and is configured to transmit a light incident thereupon; and a photo/electric converter element, which is configured to input the light transmitted through said photo transmitting member, so as to output a predetermined electric signal therefrom.

Also, according to other embodiment differing from the above, said photo detector units are disposed within said projection object, in plural number of sets thereof.

Further, according to other embodiment differing from the above, said light source includes therein: a red color light source for irradiating a red color light towards said reflection mirror; a green color light source for irradiating a green color light towards said reflection mirror; and a blue color light source for irradiating a blue color light towards said reflection mirror.

Further, according to a method for adjusting vibration condition of a reflection mirror, within an image displaying apparatus, having: a reflection mirror, which is configured to display an image on a projection object, upon receiving a light irradiated from a light source thereon, to reflect it into a predetermined direction; and a reflection mirror vibrating mechanism, which is configured to vibrate said reflection mirror into a predetermined direction, comprises the following steps of: a first step for presuming temperature on said reflection mirror, responding on driving condition of said light source; and a second step for adjusting vibration condition of said reflection mirror by said reflection vibration mechanism, so as to fit the temperature on said reflection mirror, which is presumed in said first step.

According to the present invention, within the image displaying apparatus comprising the reflection mirror vibrating in a first axial direction and a second axial direction, even when increasing an output energy from the light source, so as to obtain high brightness of the projection image, it is possible to prevent ill effects from being generated in the structures of the reflection mirror due to that, and therefore it is possible to prevent ill influences from being extorted upon the driving condition of the reflection mirror.

BRIEF DESCRIPTION OF THE DRAWINGS

Those and other objects, features and advantages of the present invention will become more readily apparent from the following detailed description when taken in conjunction with the accompanying drawings wherein.

DESCRIPTION OF THE PREFERRED EMBODIMENTS

Hereinafter, embodiments according to the present invention will be fully explained by referring to the attached drawings.

Figure 1:
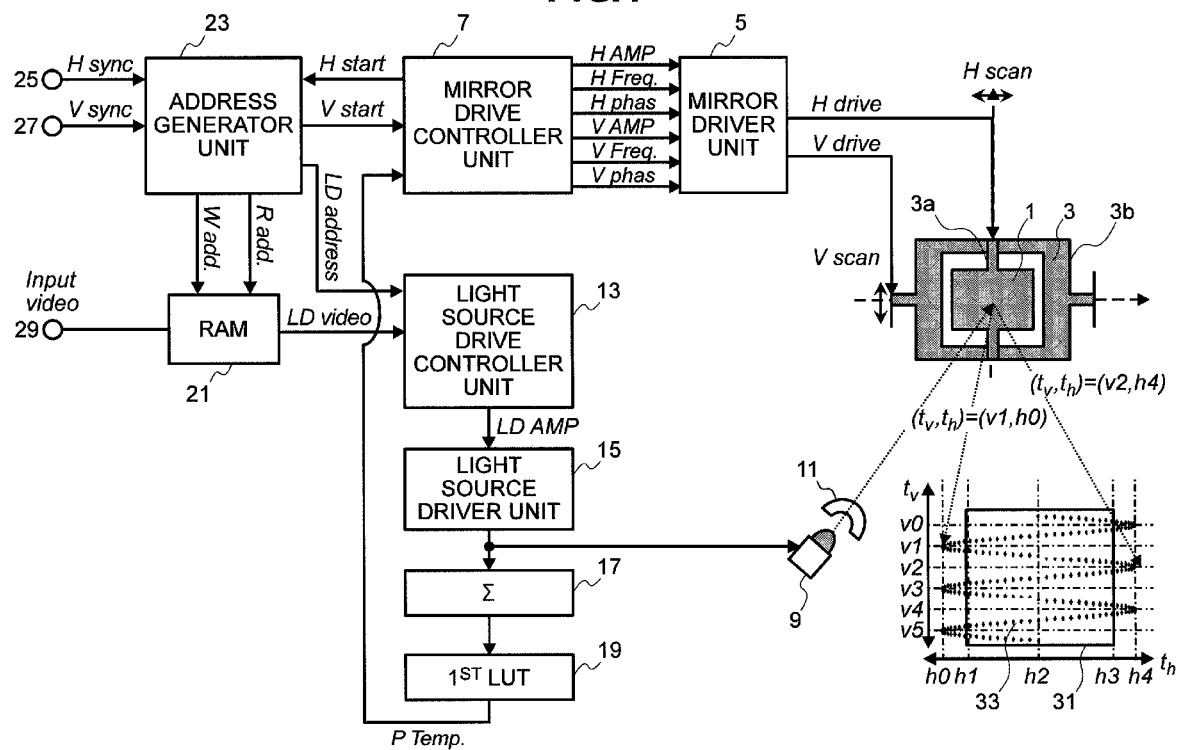
FIG. 1 is a function block diagram for showing the entire structures of an image displaying apparatus, according to a first embodiment of the present invention.

FIG. 1 is a function block diagram for showing the entire structures of an image displaying apparatus, according to a first embodiment of the present invention.

The image displaying apparatus mentioned above comprises, as shown in FIG. 1, a MEMS resonance mirror (hereinafter, being described as "micro mirror") 1, a mirror driving/holding mechanism 3, a mirror driver portion or unit 5, a mirror drive controller portion or unit 7, a light source 9, and a beam light producer lens 11. In addition to those mentioned above, the image displaying apparatus mentioned above further also comprises a light source drive controller portion or unit 13, a light source driver portion or unit 15, a light amount integrator portion or unit 17, a first lookup table holder portion or unit (hereinafter, being described as "first LU holder unit") 19, a RAM 21 and an address generator portion or unit 23.

The address generator unit 23 generates a write-in address signal (hereinafter, being described as "W add") to the RAM 21 upon basis of a horizontal synchronization signal (hereinafter, being described as "H sync") inputted from a first input terminal 25 and a vertical synchronization signal (hereinafter, being described as "V sync") inputted from a second input terminal 27. The address generator unit 23 outputs the W add generated therein into the RAM 21, so as to designate a memorizing position for a video signal (hereinafter, being described as "video") inputted into the RAM 21 from a third input terminal 29, within the RAM 21. With this, the video mentioned above can be stored into the memory location within the RAM 21, which is designated by the W add.

The address generator unit 23 further inputs therein a horizontal direction vibration reference signal (hereinafter, being described as "H start"), i.e., a reference signal for vibration (oscillation) of the micro mirror 1 in the horizontal direction, which is outputted from the mirror drive controller unit 7. The address generator unit 23 also generates a vertical direction vibration reference signal (hereinafter, being described as "V start"), i.e., a reference signal for vibration (or, oscillation) of the micro mirror 1 in the vertical direction, upon basis of the H start mentioned above, so as to output that V start to the mirror drive controller unit 7. In this case, it is also possible to synchronize the timing for generating the V start with the timing of inputting the V sync from the second input terminal 27 to the address generator unit 23. The address generator unit 23, in synchronism with the inputting timing of the H start and the generating/outputting timing of the V start, generates a display position (i.e., coordinates); in other words, a laser diode address signal (hereinafter, being described as "LD Address") indicative of a specific pixel of video information during a raster scanning (actually, it can be defined by a specific time within a time period when the raster scanning is conducted). And, it outputs that LD Address to the light source drive controller unit 13.

This LD Address is a signal, being necessary for drive (ON/OFF) timing of a semiconductor laser, e.g., the light source 9, and for the drive timing of the micro mirror 1; thus, for controlling the vibration (or, oscillation) timing in the horizontal direction and the vibration (or, oscillation) timing in the vertical direction. With this LD Address, driving (ON/OFF) of the light source (e.g., the semiconductor laser) 9 is controlled through the light source drive controller unit 13 and the light source driver unit 15, and also through the mirror drive controller unit 7 and the mirror driver unit 5, the vibration (or, oscillation) in the horizontal direction and the vibration (or, oscillation) in the vertical direction of the micro mirror 1 can be controlled. In other words, through the raster scanning conducted through the ON/OFF drive of the light source 9 and the vibrations in two (2) axial directions of the micro mirror 1, a projection image or picture in relation to original image information can be formed on a screen. And, within that projection image, a brightness is adjusted at the position (e.g., the pixel) on the plane coordinates (X,Y), corresponding to the LD Address mentioned above, upon basis of a LD video outputted from the RAM 21 by an R Address, which will be explained later. LD Address, R Address and LD Address will be mentioned later, in details thereof.

The address generator unit 23 generates the R Address, as well as, generation of the LD Address mentioned above, in synchronism with the timing for inputting the H start and the timing for generating/outputting the V start. That R Address is an address signal for reading out the video stored in the Address (e.g., the memory location) corresponding to the LD Address within the RAM 21. That R Address is outputted from the address generator unit 23 into the RAM 21.

The RAM 21 inputs the video from the third input terminal and the W Address from the address generator unit 23. And, it stored that video at the memory location corresponding to the W Address, within the RAM 21. The RAM 21, while inputting the R Address from the address generator unit 23, also outputs the video, which is stored at the memory location corresponding to that R Address, to the light source drive controller unit 13, as the LD video mentioned above, i.e., the signal for driving the laser diode, or the light source 9.

The light source drive controller unit 13 inputs the LD Address from the address generator unit 23 and the LD video from the RAM 21, respectively. And, it obtains an amplification factor fitting to that LD Address and amplifies that LD video by the amplification factor obtained; thereby generating LD AMP, i.e., a signal for driving the laser diode, or the light source 9, and it also outputs that LD AMP generated to the light source driver unit 15.

The light source driver unit 15 drives the light source 9, upon basis of the LD AMP mentioned above, which is outputted from the light source drive controller unit 13. Thus, the light source driver unit 15 turns ON/OFF electricity supplies from an electric power source to the light source 9, and in particular, when the supply of electricity is ON from the electric power source to the light source 9, it supplies an electric power, being amplified by the amplification factor based on the LD AMP mentioned above, to the light source 9. The driving electric power to be supplied with the light source 9 is adjusted in such a manner, by the light source driver unit 15, that it is relatively small when scanning on both end portions in the horizontal direction and in the vicinity thereof or that it is relatively large when scanning at a central portion in the horizontal direction and in the vicinity thereof, during within the raster scanning. Also, during within the raster scanning, the light source driver unit 15 adjusts the driving electric power to be supplied with the light source 9, such that it becomes large when scanning a pixel area or region of a relatively bright color, such as, a white color or a warm color, for example, while it becomes small when scanning a pixel area or region of a relatively dark color, such as, a black color or a cold color, for example.

In the present embodiment, as the light source 9 is applied a laser light source, which can irradiate a beam-like light and modulate an amount of lights therefrom at high speed, easily. However, it is of course that the light source 9, according to the present invention, should not be restricted only to the laser light source. For example, in the place of the laser light source may be applied any one of the following light sources, such as, LED (light emitting diode), an ultrahigh-pressure mercury lamp, a electrode-less lamp, etc., for example, together with an optical part for condensing the lights irradiated from that light source and/or a light modulator part of the light amount. The light source 9, as was mentioned above, is turned ON/OFF with the driving electric power supplied from the electric power source to the light source 9, under the control of the light source drive controller unit 13, and in particular, when the driving electric power is ON, it is driven by the light source driver unit 15, which amplifies and output that driving electric power in the manner mentioned above; i.e., produces a laser light and outputs it.

The beam light producer lens 11, upon receipt of the laser light from the light source 9, produces a laser beam light, and it emits that laser beam light towards the micro mirror.

The light amount integrator unit 17 obtains a total amount of light emission of the laser light irradiated from the light source 9 towards the beam light producer lens 11, within a predetermined reference time-period. For example, if reproducing the video information for 60 frames during one (1) second (within the reference time-period), as the projection image on the screen by the raster scanning, then the light amount integrator unit 17 accumulates or integrates the electric energy for each frame, which is supplied from the electric power source to the light source through the light source driver unit 15, until elapsing one (1) second, i.e., completing the raster scanning for 60 frames. From this integrated value of the driving electric power can be calculated the total amount of light emission of the light source 9. Within the integrated value data mentioned above is the data of driving electric power amount per a pixel, i.e., data of light emission amount. When obtaining the data of integrated value about the light emission amount, the light amount integrator unit 17 produces a histogram of that light emission amount (i.e., data of integrated value of the driving electric power), and outputs that histogram to the first LUT holder unit 19.

The first LUT holder unit 19 accumulates or integrates the histograms, each of which is outputted from the light amount integrator unit 17 every time when the predetermined reference time-period passes. The histograms of the light emission amount per each the reference time-period, which are accumulated within the first LUT holder unit 19, build up history data of the past, indicating the manners, such as, what is the temperature distribution on the micro mirror 1 and/or how the temperature is changing on the micro mirror 1, for example. The first LUT holder unit 19 outputs the above-mentioned past history data, which is stored therein, to the mirror drive controller unit 7, responding to a read-out request from that mirror drive controller unit 7.

The mirror drive controller unit 7, as well as, outputting the H start mentioned above to the address generator unit 23, also inputs the V start mentioned above, which is outputted from the address generator unit 23. The mirror drive controller unit 7, reading out the past history data in relation to temperature changes of the micro mirror 1, which is stored for each of predetermined reference time zones, from the first LUT holder unit 19, also assumes or estimates, what will be the temperature of the micro mirror 1 at the present of time, upon basis of the past history data that is read out. And, it makes up the estimated temperature of the micro mirror 1 to be the temperature P temp of the micro mirror at the present time point.

Herein, since the temperature P temp of the micro mirror 1 is affected or influenced by brightness/darkness of each pixel included in each of the frames, then the temperature P temp mentioned above links with the change of the above-mentioned LD video to be outputted from the RAM 21 to the light source drive controller unit 13. This is because of the fact that, depending upon a material building up the micro mirror 1, a portion of the laser beam lights incident upon the micro mirror 1, not being reflected thereon, but absorbed to turn into heats therein, and depending upon the temperature characteristics of the material building up this micro mirror 1, the vibration (or, oscillation) conditions of the micro mirror 1 are changed, in the horizontal direction and the vertical direction.

The mirror drive controller unit 7 selects H Freq, H AMP and H phase, which are most suitable for obtaining the P temp mentioned above, among plural numbers of vibration (or, oscillation) frequencies H freq, plural numbers of vibration (or, oscillation) amplitudes H AMP, and plural numbers of vibration (or, oscillation) phases H phas; i.e., the predetermined vibration (or, oscillation) conditions in the horizontal (H) direction, being necessary for setting up a value of temperature of the micro mirror 1 at a predetermined value. At the same time of this, upon basis of the H start and the V start mentioned above, the mirror drive controller unit 7 selects V Freq, V AMP and V phase, which are most suitable for obtaining the P temp mentioned above, among plural numbers of vibration (or, oscillation) frequencies V freq, plural numbers of vibration (or, oscillation) amplitudes V AMP, and plural numbers of vibration (or, oscillation) phases V phas; i.e., the predetermined vibration (or, oscillation) conditions in the vertical (V) direction, being necessary for setting up a value of temperature of the micro mirror 1 at a predetermined value.

The mirror drive controller unit 7 outputs those H Freq, H AMP, H phas, V Freq, V AMP, and V phas mentioned above to the mirror driver unit 5.

The mirror driver unit 5, when inputting those H Freq, H AMP, H phas, V Freq, V AMP, and V phas mentioned above, from the mirror drive controller unit 7, produces H drive and V drive upon those signals, respectively; i.e., a mirror driving signal for vibrate (or, oscillate) the micro mirror 1 in the horizontal (H) direction and a mirror driving signal for vibrate (or, oscillate) the micro mirror 1 in the vertical (V) direction. The mirror driver unit 5 outputs the mirror driving signals, e.g., H drive and V drive, to the mirror driving/holding mechanism 3.

The mirror driving/holding mechanism 3 is made up with a horizontal (H) direction driving/holding mechanism 3a, for holding the micro mirror 1 to freely vibrate (or, oscillate) in the horizontal (H) direction, and a vertical (V) direction driving/holding mechanism 3b, for holding the micro mirror 1 to freely vibrate (or, oscillate) in the vertical (V) direction. In such mirror driving/holding mechanism 3, a vibration speed of the micro mirror 1 in the horizontal (H) direction, by means of the horizontal (H) direction driving/holding mechanism 3a, is set at a value larger than the vibration speed of the micro mirror 1 in the vertical (V) direction, by means of the vertical (V) direction driving/holding mechanism 3b. For this reason, after repeating the vibration of micro mirror 1 in the H direction, a several number of times thereof, the vibration thereof in the V direction is conducted only one (1) time.

For example, when displaying the image information corresponding to (640 pixels×480 lines) of VGA (Video Graphics Array) at a renewal speed of 60 Hz (i.e., displaying the video information for 60 frames during one (1) second), within the image displaying apparatus shown in FIG. 1, for example, there can be established the following relationship, i.e., the vibration (or, oscillation) number of the micro mirror 1 in the H direction is equal to 15 KHz or more than that, and the vibration (or, oscillation) number thereof in the V direc-tion is equal to 30 KHz or more than that. In other words, during a half (½) cycle of the vibration (or, oscillation) of the micro mirror 1 in the V direction, the vibration (or, oscillation) of the micro mirror 1 occurs in the H direction occurs, 250 times or more than that. Hereinafter, explanation will be made, upon assumption that the micro mirror 1 vibrates (or, oscillates) three (3) times in the H direction, during when it vibrates (or, oscillates) only one (1) time in the V direction, for easily understanding thereof.

Within the mirror driving/holding mechanism 3, when the H drive is outputted from the mirror driver unit 5, the horizontal (H) direction driving/holding mechanism 3a vibrates the micro mirror 1 in the horizontal (H) direction, upon the H drive, and when the V drive is outputted from the mirror driver unit 5, the vertical (V) direction driving/holding mechanism 3b vibrates the micro mirror 1 in the vertical (V) direction. Thus, the mirror driving/holding mechanism 3 holds the micro mirror 1 to be vibrated in two (2) directions (i.e., the direction of H axial and the direction of V axial), freely, corresponding to the H drive and the V drive, which are outputted from the mirror driver unit 5.

The micro mirror 1 is made, mainly, of a material, such as, silicon, for example, and as was mentioned previously, it is not able to reflect all or the entire beam lights incident thereupon (i.e., the reflectivity thereof is not 100%). Though a very little, for example, about 10% of the beam lights incident thereupon are absorbed into the micro mirror 1, and due to this fact the micro mirror generates heats therein. The micro mirror 1 receives thereupon the laser lights from the light source 9, which are condensed to be beam-like through the beam light producer lens 11, and is vibrated in the horizontal (H) direction by means of the horizontal (H) direction driving/holding mechanism 3a and in the vertical (V) direction by means of the vertical (V) direction driving/holding mechanism 3b, respectively.

With this, the laser beam light reflected upon the micro mirror 1 is irradiated upon a display area of the video information, which is shown by a reference numeral on the screen, and thereby achieving the raster scanning along a locus, as shown by a broken line 33. However, on an axis, in parallel with a side of the display area 31 in the vertical direction thereof, are plotted times $t_v$ ($v_0$, $v_1$, $v_2$, $v_3$, $v_4$, $v_5$) relating to the vibration (or, oscillation) of the micro mirror 1 in the vertical (V) direction, and on an axis, in parallel with a side of the display area 31 in the horizontal direction thereof, are plotted time $t_h$ ($h_0$, $h_1$, $h_2$, $h_3$, $h_4$, $h_5$), respectively. The locus 33 of raster scanning of the laser beam light mentioned above, starting from a point positioning near to an upper end of a center line $h_2$ along with the vertical direction within the above-mentioned display area 31, passes through an intersecting point $(t_v,t_h)=(v_0,h_4)$ between a segment $v_0$, being in parallel with the axis $t_h$, and a segment $h_4$, being in parallel with the axis $t_v$, and also through an intersecting point $(t_v,t_h)=(v_1,h_0)$ between a segment $v_3$, being in parallel with the axis $t_h$, and a segment $h_0$, being in parallel with the axis $t_h$. And, the locus 33 of raster scanning also passes through, an intersecting point $(t_v,t_h)=(v_2,h_4)$ between a segment $v_2$, being in parallel with the axis $t_h$, and a segment $h_4$, through an intersecting point $(t_v,t_h)=(v_3,h_0)$ between a segment $v_3$, in parallel with the axis $t_h$, and a segment $h_0$, and through an intersecting point $(t_v,t_h)=(v_4,h_4)$ between a segment $v_3$, being in parallel with the axis $t_h$, and a segment $h_4$, too. And, further, the locus 33 of raster scanning also passes through an intersecting point $(t_v,t_h)=(v_5,h_0)$ between a segment $v_5$, being in parallel with the axis $t_h$, and a segment $h_0$, and through an intersecting point between a side at a lower end of the display area 31 and the center line $h_2$, too.

Thus, in the raster scanning mentioned above, the vibration (or, oscillation) of the micro mirror 1 generates three (3) times, in the H direction, during a half cycle of the vibration (or, oscillation) of the micro mirror 1 in the V direction thereof.

Figure 2:
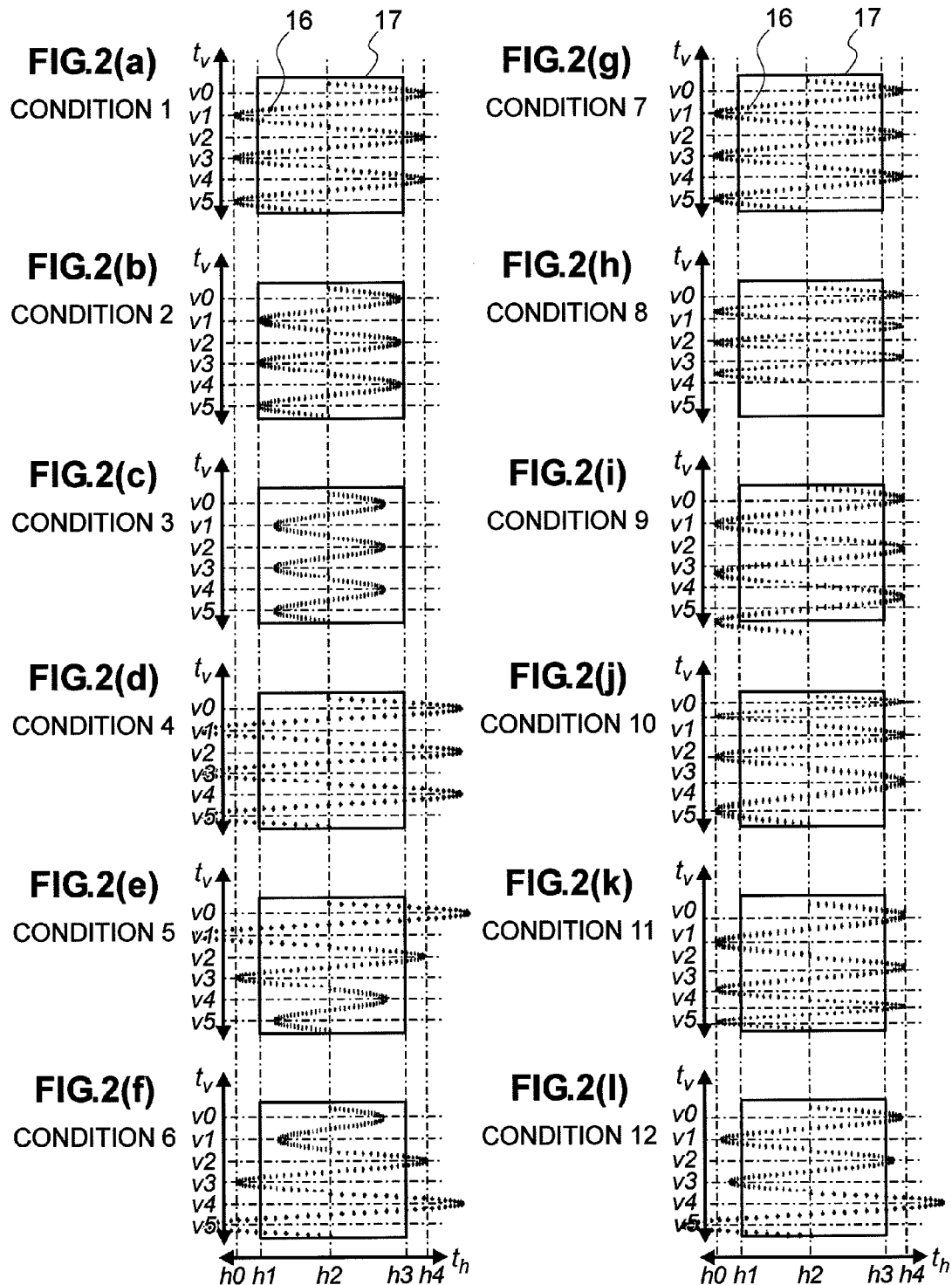
FIGS. 2(a) to 2(l) are explanatory views for showing a manner of raster scanning, which is conducted within the image displaying apparatus described in FIG. 1 mentioned above.

FIGS. 2(*a*) to 2(*l*) are explanatory views for showing the condition of the raster scanning, which is conducted within the image displaying apparatus described in FIG. 1.

In FIGS. 2(*a*) to 2(*l*), in particular, the condition 1 shown in FIG. 2(*a*) shows an ideal condition of the raster scanning, wherein the raster scanning stars from a point positioning near to the upper end of the center line $h_2$, passing through the intersecting point $(t_v,t_h)=(v_0,h_4)$, the intersecting point $(t_v,t_h)=(v_1,h_0)$, the intersecting point $(t_v,t_h)=(v_2,h_4)$, the intersecting point $(t_v,t_h)=(v_3,h_0)$ the intersecting point $(t_v,t_h)=(v_4,h_4)$ and the intersecting point $(t_v,t_h)=(v_5,h_0)$, and reaches to the intersecting point between the side at the lower end of the display area 31 and the center line $h_2$.

Under the condition that the driving (or, oscillating) condition for each of the mirrors mentioned above is fixed, i.e., H AMP, H Freq, H phas, V AMP, V Freq, and V phas, to be set up within the mirror drive controller unit 7, an amount of the laser beam light to be incident upon the micro mirror varies, and accompany with that, when the temperature P temp of the micro mirror 1 is changed, there is generated a possibility that the raster scanning cannot be carried out appropriately. Under the condition 2 shown in FIG. 2(*b*), the locus 33 of the raster scanning does not reach to the intersecting point $(t_v,t_h)=(v_0,h_4)$, the intersecting point $(t_v,t_h)=(v_2,h_4)$ and the intersecting point $(t_v,t_h)=(v_4,h_4)$, but it reaches from the position near to the upper end of the center line $h_2$, i.e., the starting point of the raster scanning, up to an intersecting point between a side at the lower end of the display area 31 and the center line $h_2$. Also, under the condition 3 shown in FIG. 2(*c*), it does not reach to even the intersecting point $(t_v,t_h)=(v_1,h_0)$, the intersecting point $(t_v,t_h)=(v_3,h_0)$ and the intersecting point $(t_v,t_h)=(v_5,h_0)$, further, in addition to the respective intersecting points where it does not reach to under the condition 2 shown in FIG. 2(*b*), but it reaches from the position near to the upper end of the center line $h_2$, i.e., the starting point of the raster scanning, up to the intersecting point between the side at the lower end of the display area 31 and the center line $h_2$.

Thus, either one of the condition 2 or the condition 3 indicates that the amplitude of the vibration (or, oscillation) is short or insufficient, in particular, in the horizontal (H) direction.

Next, under the condition 4 shown in FIG. 2(*d*), the locus 33 of the raster scanning 33 reaches from the position near to the upper end of the center line $h_2$ up to the intersecting point between the side at the lower end of the display area 31 and the center line $h_2$, exceeding the intersecting point $(t_v,t_h)=(v_0,h_4)$, the intersecting point $(t_v,t_h)=(v_1,h_0)$, the intersecting point $(t_v,t_h)=(v_2,h_4)$ the intersecting point $(t_v,t_h)=(v_3,h_0)$, the intersecting point $(t_v,t_h)=(v_4,h_4)$ and the intersecting point $(t_v,t_h)=(v_5,h_0)$, greatly.

Thus, the condition 4 indicates that the amplitude of the vibration (or, oscillation) is excessive, in particular, in the horizontal (H) direction of the micro mirror 1.

Next, under the condition 5 shown in FIG. 2(*e*), the locus of the raster scanning 33 goes beyond the intersecting point $(t_v,t_h)=(v_0,h_4)$ and the intersecting point $(t_v,t_h)=(v_1,h_0)$, greatly, where it would intrinsically intersects with them, since the amplitude of the vibration (or, oscillation) is excessive in the horizontal (H) direction of the micro mirror 1, within a time region from the position near to the upper end of the center line $h_2$, i.e., the starting point of the raster scanning, up to the position where it intersects with the section $v_0$, and also in a time region from the position where it intersects with the section $v_0$ up to when it intersects with the section $v_1$. Also, within a time region from the position where it intersects with the section $v_4$ to the position where it intersects with the section $v_5$, since the amplitude of the vibration (or, oscillation) is short or insufficient in the horizontal (H) direction of the micro mirror 1, the locus of the raster scanning 33 does not reach to the intersecting point $(t_v,t_h)=(v_4,h_4)$ and the intersecting point $(t_v,t_h)=(v_5,h_0)$, greatly, where it would intrinsically intersects with them. The time region where the amplitude of the vibration (or, oscillation) is appropriate in the value thereof is only a time region from the position where the locus of the raster scanning 33 intersects with the section $v_2$ up to the position where it intersects with the section $v_3$.

Next, under the condition 6 shown in FIG. 2(*f*), the locus of the raster scanning 33 does not reach to the intersecting point $(t_v,t_h)=(v_0,h_4)$ and the intersecting point $(t_v,t_h)=(v_1,h_0)$, greatly, where it would intrinsically intersects with them, since the amplitude of the vibration (or, oscillation) is short or insufficient in the horizontal (H) direction of the micro mirror 1, within the time region from the position near to the upper end of the center line $h_2$, i.e., the starting point of the raster scanning, up to the position where it intersects with the section $v_0$, and also in the time region from the position where it intersects with the section $v_0$ up to when it intersects with the section $v_1$. Also, within the time region from the position where it intersects with the section $v_4$ to the position where it intersects with the section $v_5$, since the amplitude of the vibration (or, oscillation) is excessive in the horizontal (H) direction of the micro mirror 1, the locus of the raster scanning 33 goes beyond to the intersecting point $(t_v,t_h)=(v_4,h_4)$ and the intersecting point $(t_v,t_h)=(v_5,h_0)$, greatly, where it would intrinsically intersects with them. The time region where the amplitude of the vibration (or, oscillation) is appropriate in the value thereof is only a time region from the position where the locus of the raster scanning 33 intersects with the section $v_2$ up to the position where it intersects with the section $v_3$.

Therefore, in case where the locus 33 of the raster scanning is in the condition 2 shown in FIG. 2(b) and the condition 3 shown in FIG. 2(c), the mirror drive controller unit 7 adjusts the H AMP, i.e., the control signal for the vibration (or oscillation) amplitude, which is outputted to the mirror driver unit 5, so as to increase the amplitude of the vibration (or oscillation) in the horizontal (H) direction of the micro mirror 1, thereby controlling it under the condition 1 shown in FIG. 2(a). Also, in case where the locus 33 of the raster scanning is in the condition 4 shown in FIG. 2(d), then the mirror drive controller unit 7 adjusts the H AMP, i.e., the control signal for the vibration (or oscillation) amplitude, which is outputted to the mirror driver unit 5, so as to reduce the amplitude of the vibration (or oscillation) in the horizontal (H) direction of the micro mirror 1, thereby controlling it under the condition 1 shown in FIG. 2(a).

Further, in the case where the locus 33 of the raster scanning is in the condition 5 shown in FIG. 2(e) and the condition 6 shown in FIG. 2(f), the mirror drive controller unit 7 adjusts the H AMP, i.e., the control signal for the vibration (or oscillation) amplitude, which is outputted to the mirror driver unit 5, so as to increase or reduce the amplitude of the vibration (or oscillation) in the horizontal (H) direction of the micro mirror 1, appropriately, and thereby controlling it under the condition 1 shown in FIG. 2(a).

However, the mirror drive controller unit 7 may adjust the H Freq, i.e., the control signal for the vibration (or oscillation) frequency, in the place of the control signal for the vibration (or oscillation) amplitude, so as to obtain increasing/decreasing of the amplitude of the vibration (or oscillation) in the horizontal (H) direction of the micro mirror 1. Irrespective of conduction of increasing/decreasing the amplitude of the vibration (or oscillation) in the horizontal (H) direction of the micro mirror 1 by the variable adjustment of H AMP or the adjustment of H Freq, however an adjustment is made upon the control signal, V phas for the vibration (or oscillation) phase, in synchronism with those adjustments, so as to produce the vibration reference signal of horizontal direction mentioned above, i.e., H start, and thereby a laser light is irradiated from the light source 9, upon basis of a drover signal for the light source 9 fitting to that amplitude, i.e., LD video, while controlling the amplitude of vibration (or oscillation) in the horizontal (H) direction of the micro mirror 1, to be constant.

However, the case of the condition 7 shown in FIG. 2(g) shows that it is under the ideal condition of the raster scanning, similar to the case of the condition 1 shown in FIG. 2(a), and the case of the condition 8 shown in FIG. 2(h) shows that the amplitude of vibration (or oscillation) of the micro mirror 1 is short or insufficient in the vertical (V) direction. Next, the case of the condition 9 shown in FIG. 2(i) shows that the amplitude of vibration (or oscillation) is excessive in the vertical (V) direction, and the case of the condition 10 shown in FIG. 2(j) shows that the locus 33 of the raster scanning comes to be long in the cycle of a sine wave, as it goes down in the figure. Next, the case of the condition 11 shown in FIG. 2(k) shows that, on the contrary to the case of the condition 10 shown in FIG. 2(j), the locus 33 of the raster scanning comes to be short in the cycle of the sine wave, as it goes down in the figure.

Further, the case of the condition 12 shown in FIG. 2(l) shows the condition of combining the condition, which is similar to the condition 6 shown in FIG. 2(f), and the condition, which is similar to the condition 11 shown in FIG. 2(k), wherein the amplitude of vibration (or oscillation) of the micro mirror 1 changes both, in the horizontal (H) direction and also in the vertical (V) direction.

As was explained in the above, according to the first embodiment of the present invention, in case where there is an interrelation or correlation between the temperature of the micro mirror 1 and the amplitude of the vibration (or oscillation) in the horizontal (H) direction, which the micro mirror 1 can take, the locus 33 of the raster scanning is controlled, so as to be in the condition 1 shown in FIG. 2(a), through adjusting the H AMP or H Freq, such that the temperature of the micro mirror 1 comes to be a preset value of temperature while determining the temperature of the micro mirror 1 upon basis of ant amount of the laser beam emitted from the light source 9, and thereby enabling the projection display within the display area or region on the screen, with stability.

Within the first embodiment of the present invention mentioned above, although optimization is made upon the driving (oscillating) condition of the micro mirror (i.e., H AMP, H Freq, H phas, VAMP, V Freq and V phas), which is determined by the mirror drive controller unit 7, depending upon the temperature of the micro mirror 1, however driving of the micro mirror 1 may be also stabilized, through controlling the temperature of the micro mirror 1, by cooling down the micro mirror 1, compulsively. Or, without adjusting the H AMP and the H Freq, it may be also treated with, for example, changing the phase of staring the radiation of the laser beam light upon basis LD video.

However, a turbulence is generated in the synchronization, when adjusting the H Freq while fixing the V Freq, but it is also possible to obtain the synchronization between the vibration in the vertical (V) direction and the vibration in the horizontal (H) direction, i.e., stopping the vibration (or oscillation) in the horizontal (H) direction, in the vibration (or oscillation) in the vertical (V) direction, during the time when the vibration (or oscillation) direction is reversed, and starting the vibration in the horizontal (H) direction, again, in synchronism with the timing when staring the vibration (or oscillation) in the vertical (V) direction. Further, upon adjusting the H Freq, H AMP and H phas, while conducting the raster scanning, when the time is different when it passes through each of the pixels, then it is also possible to increase/decrease the intensity of the laser light outputted from the light source 9, so as to bring an accumulated or integrated amount of the lights for each of the pixels to be constant.

Figure 3:
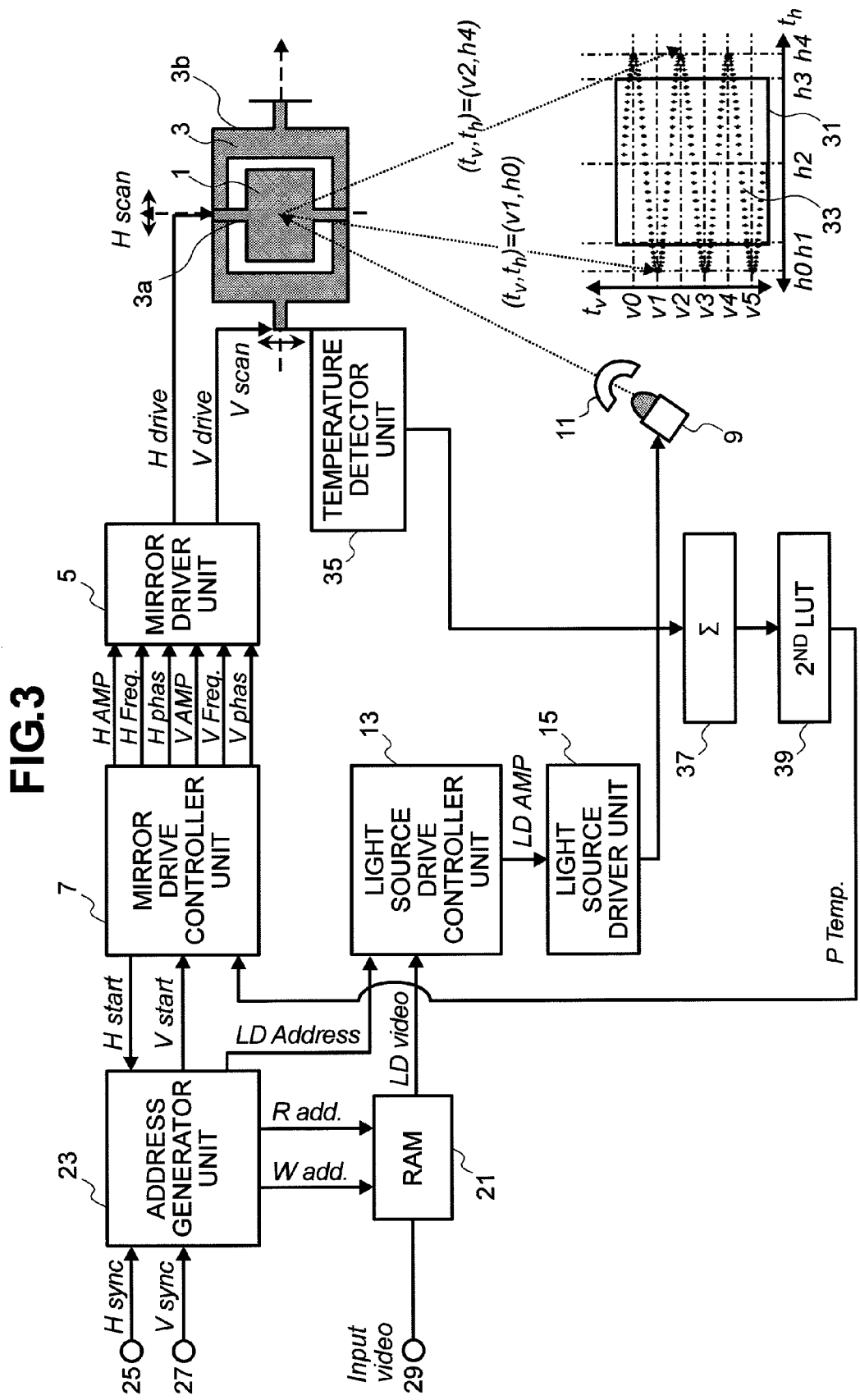
FIG. 3 is a function block diagram for showing the entire structures of an image displaying apparatus, according to a second embodiment of the present invention.

FIG. 3 is a function block diagram for showing the entire structures of the image displaying apparatus, according to a second embodiment of the present invention.

The image displaying apparatus shown in FIG. 3 differs from the image displaying apparatus (e.g., according to the first embodiment of the present invention) shown in FIG. 1, in the structures thereof, in particular, in the following aspects: i.e., removing the light amount integrator unit 17 and the first LUT holder unit 19 from the structures shown in FIG. 1, and also adding a temperature detector unit 35, a detected temperature value integrator unit 37, and a second lookup table holder unit (hereinafter, being described as "second LUT holder unit") 39. However, with the structures shown in FIG. 3, but other than those are same to those shown in FIG. 1, and therefore will be omitted the explanation about the details thereof.

In FIG. 3, the temperature detector unit 35 is disposed in vicinity of the micro mirror 1, and it detects the temperature of the micro mirror 1, so as to output an electric signal depending on the value of temperature detected, to the detected temperature value integrator unit 37. The detected temperature value integrator unit 37, inputting the temperature detection signal outputted from the temperature detector unit 35, obtains accumulated value data of the temperature value of the micro mirror 1 during a reference time-period, which is determined in advance. For example, if assuming that the video information for 60 frames are reproduced through the raster scanning, as the projection image on the screen, during 1 second (within the reference time-period), for example, then the detected temperature value integrator unit 37 accumulates the temperature value detected for each frame, which is outputted from the temperature detector unit 35, until when it completes the raster scanning for 60 frames, after elapsing 1 second.

Within this accumulated data of detected temperature values is included a temperature value detected for each of the pixels included in each of the frames. When obtaining the accumulated data of detected temperature values, the detected temperature value integrator unit 37 produces a histogram of that accumulate data, and outputs that histogram to the second LUT holder unit 39.

The second LUT holder unit 39 stores therein the histograms of the accumulated data mentioned above, each of which is outputted from the detected temperature value integrator unit 37 each time when passing the predetermined reference time-period. The histograms of the accumulated data for each reference time-period, which are stored within the second LUT holder unit 39, function as the history data of the past indicative of a manner of temperature distribution on the micro mirror 1 or a manner of changing of temperature on the micro mirror 1. The second LUT holder unit 39 outputs the history data of the past, which are stored therein, to the mirror drive controller unit 7, responding to a request for reading out the data made from that mirror drive controller unit 7. Further, the mirror drive controller unit 7 determines the driving (or oscillating) condition for the micro mirror 1, as was mentioned above, in accordance with the processing steps, being similar to those within the first embodiment of the present invention shown in FIG. 1.

Therefore, also within the present embodiment, it is possible to control the locus 33 of the raster scanning, by the vibration (or oscillation) of the micro mirror 1, so that it approaches to the ideal condition of the raster scanning shown in FIG. 2(a).

As was mentioned above, according to the second embodiment of the present invention, as well as, detecting the change of temperature on the micro mirror 1, accurately, it is also possible to determine the driving (or oscillating) condition suitable to the detected change of temperature on the micro mirror 1, thereby to drive (or oscillate) the micro mirror 1 under a stable condition of obtaining an equal vibration frequency or an equal vibration amplitude or an equal vibration phase.

Figure 4:
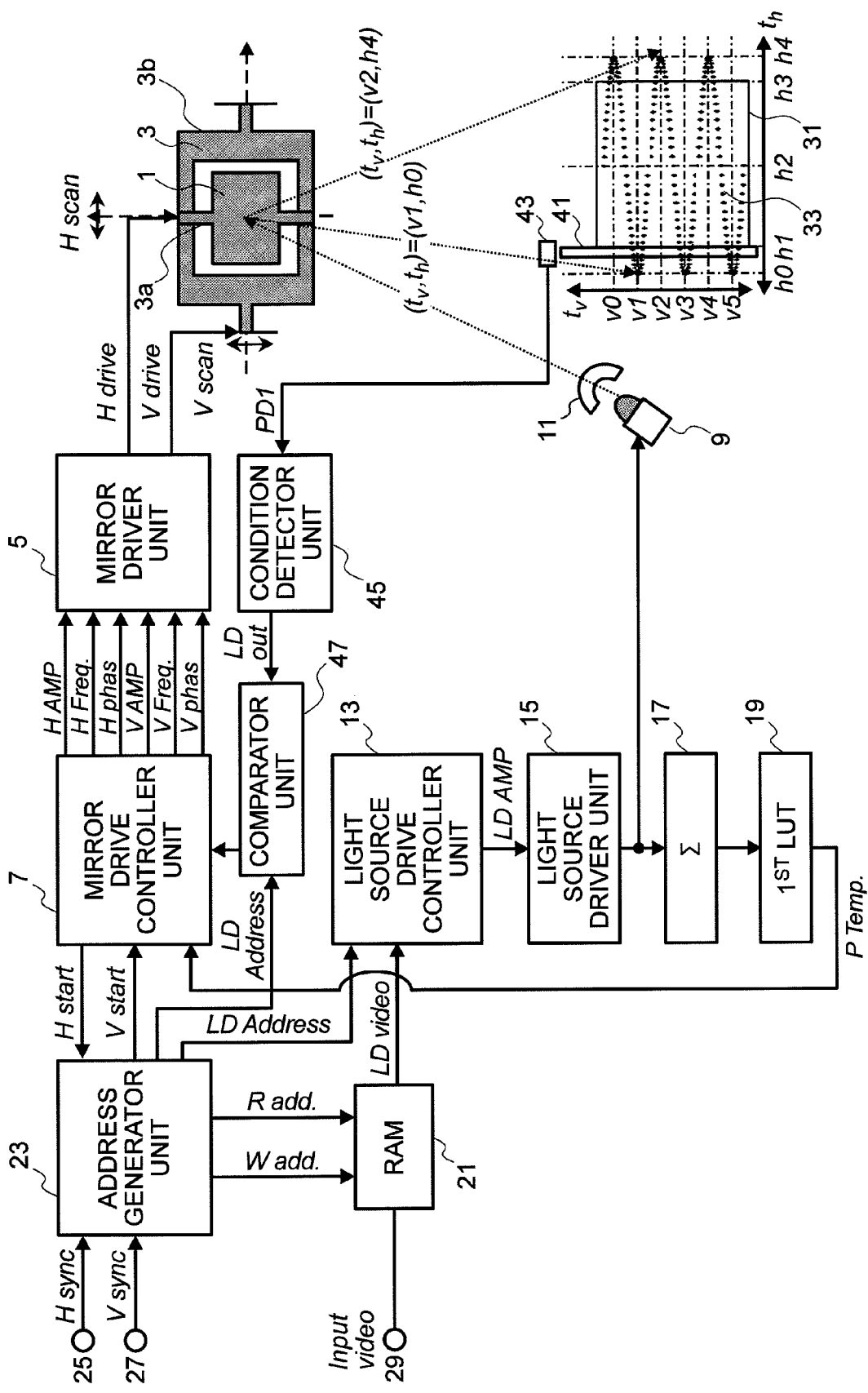
FIG. 4 is a function block diagram for showing the entire structures of an image displaying apparatus, according to a third embodiment of the present invention.

FIG. 4 is a function block diagram for showing the entire structures of the image displaying apparatus, according to a third embodiment of the present invention.

The image displaying apparatus shown in FIG. 4 differs from the image displaying apparatus (e.g., according to the first embodiment of the present invention) shown in FIG. 1, in particular, by newly adding a photo receiving member 41, a photo/eclectic converter element 43 and a condition detector portion 45, in the structures thereof. However, since the structures shown in FIG. 4, but other than those mentioned above, are same to those shown in FIG. 1, and therefore in this FIG. 4, the same reference numerals are attached for those shown in FIG. 1, but the explanation will be omitted about the details thereof.

In FIG. 4, the photo receiving member 41 is a line-like member. This photo receiving member 41 is disposed along the axis $t_v$ in FIG. 4, at a position at one of the ends of the vibration (or oscillation) in the horizontal (H) direction in the case where the locus 33 of the raster scanning is in the ideal condition (i.e., the condition like that shown in FIG. 2(b)), i.e., at least a part of an area or region, upon which the lights reflected on the micro mirror 1 can radiate (or project) upon, but not interrupting or obstructing them. Also, as was mentioned above, the axis $t_v$ indicates the direction of the vibration (or oscillation) of the micro mirror 1 in the vertical (V) direction. The photo receiving member 41, receiving the reflection lights from the micro mirror 1, reflects that reflection light received thereupon, or refracts them, into a specific direction. The photo receiving member 41 will be mentioned in more details thereof, later.

The photo/eclectic converter element 43 is provided at a position for receiving the lights, which are reflected or refracted from the photo receiving member 41. The photo/eclectic converter element 43 receives the lights, which are reflected or refracted from the photo receiving member 41, at timing when the vibration (or oscillation) in the horizontal (H) direction mentioned above intersects with the position where the photo receiving member 41 is disposed as shown in FIG. 4, on the locus 33 of the raster scanning. And, due to the lights received is generated electromotive force, and with that electromotive force, a predetermined electric signal PD1 is outputted to the condition detector portion 45. In other words, the photo/eclectic converter element 43 outputs the electric signal PD1 mentioned above, intermittently, at the timing when the above-mentioned vibration (or oscillation) in the horizontal (H) direction intersects the photo receiving member 41.

The condition detector portion 45, receiving the electric signal PD1 from the photo/eclectic converter element 43, detects the operating condition of the micro mirror 1, upon basis of that electric signal PD1. Thus, the condition detector portion 45 obtains the vibration (or oscillation) frequency data, the vibration (or oscillation) amplitude data and the vibration (or oscillation) phase data indicative of the operating condition of the micro mirror 1, through measurement on an interval of output timing of the electric signal PD1, which is outputted intermittently. The condition detector portion 45 outputs a signal LD out, including the vibration (or oscillation) frequency data, the vibration (or oscillation) amplitude data and the vibration (or oscillation) phase data therein, to a comparator unit 47.

The comparator unit 47 inputs the above signal LD out, which is outputted from the condition detector portion 45, and the signal LD address mentioned above, which is outputted from the address generator unit 23. As was mentioned previously, the signal outputted from the address generator unit 23 is the signal, being necessary for controlling the driving (ON/OFF) timing of the semiconductor laser, a being the light source 9, and the timing for driving the micro mirror 1, e.g., the vibration (oscillation) timing in the horizontal direction and the vibration (oscillation) timing in the vertical direction thereof. From that signal LD Address, it is possible to detect the drive (or oscillate) condition, being appropriate for the micro mirror 1, i.e., H Freq, H AMP and H phas.

The comparator unit 47 compares the above signal LD out and the LD Address, and outputs the result of that comparison to the mirror drive controller unit 7. The mirror drive controller unit 7 adjusts the drive (or oscillate) condition of the micro mirror 1, e.g., H Freq, H AMP and H phas, V Freq, V AMP and V phas, to be outputted to the mirror driver unit 5, again, upon basis of the comparison result mentioned above, which is outputted from the comparator unit 47.

Figure 5:
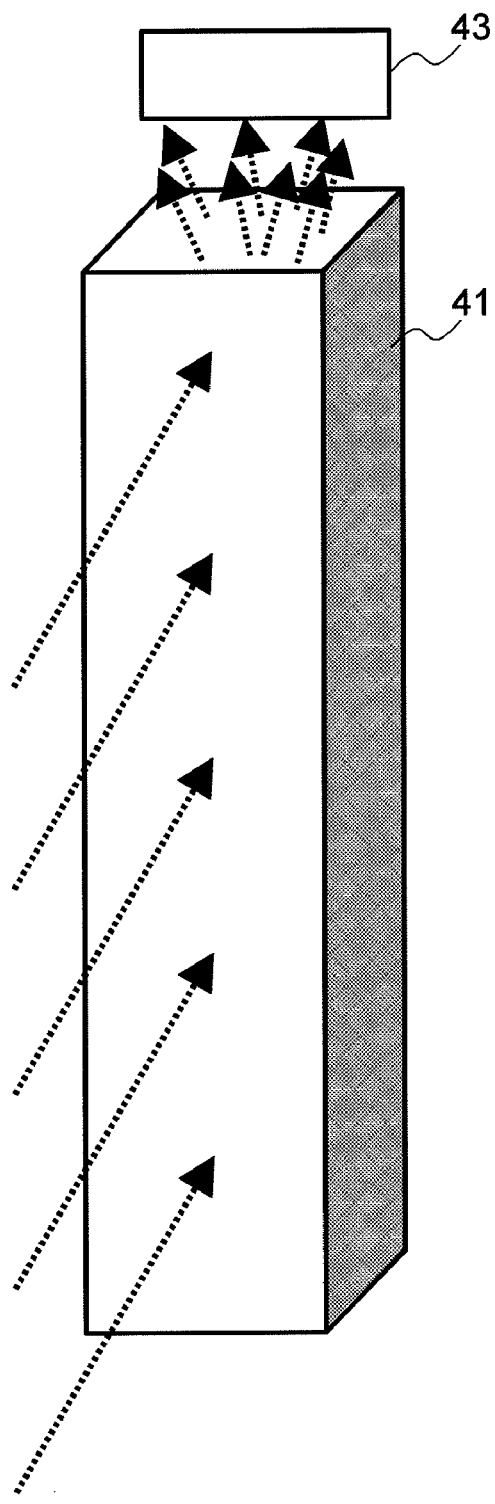
FIG. 5 is an explanatory view for showing an example of the structures of a light receiving member shown in FIG. 4.

FIG. 5 is a view for showing an example of the structures of the photo receiving member 41 shown in FIG. 4.

As is shown in FIG. 5, the photo receiving member 41 is made from an optical fiber having an about rectangular parallelepiped (or, parallelopipedon) configuration, as a whole thereof. Thus, the photo receiving member 41 has a half-mirror construction, i.e., including a light receiving surface, for receiving the lights thereon reflected on the micro mirror 1, which is in a plane-like and rectangular configuration thereof, and also a light transmission/diffusion body in an inside thereof, and a mirror surface.

However, upon the fact that the locus 33 of the raster scanning mentioned above passes through the photo receiving member 41, in addition to H AMP, H Freq and H phas, indicating the vibration (or oscillation) condition in the horizontal (H) direction, the condition detector portion 45 also obtains V AMP, V Freq and V phas, indicating the vibration (or oscillation) condition in the vertical (V) direction, as the vibration (or oscillation) frequency data, the vibration (or oscillation) amplitude data and the vibration (or oscillation) phase data, indicating the operating condition of the micro mirror 1, through the photo receiving member 41 and the photo/eclectic converter element 43.

As was explained in the above, according to the third embodiment of the present invention, with adjusting the vibration (or oscillation) condition of the micro mirror 1, in such a manner that the timing, when the lights reflected upon the micro mirror 1 (i.e., the locus 33 of the raster scanning) intersects the photo receiving member 41, comes into an appropriate vibration (or oscillation) frequency, an appropriate vibration (or oscillation) amplitude and an appropriate vibration (or oscillation) phase, it is possible to drive (or oscillate) the micro mirror 1, with stability, under the driving (or oscillating) condition suitable to the temperature of the micro mirror 1.

Also, even in case where the locus 33 of the raster scanning mentioned above moves along a longitudinal direction of the photo receiving member 41 while changing the vibration (or oscillation) direction on the photo receiving member 41, since the condition detector portion 45 can detect the change of that vibration (or oscillation) through the photo receiving member 41 and the photo/eclectic converter element 43, there is no necessity of providing that photo/eclectic converter element 43, respectively, at plural numbers of places on the photo receiving member 41, where the vibration (or oscillation) direction can be changed on the locus 33 of the raster scanning, and therefore it is possible to achieve reduction of costs of the parts thereof, easily.

With the third embodiment of the present invention, though the explanation was explained so that the photo receiving member 41 is disposed at least in a part of the area where the reflection lights from the micro mirror 1 can be irradiated (or projected), however, it is of course that the manner of disposition of the photo receiving member 41 should not be limited to that manner mentioned above. Even when the position of disposing the photo receiving member 41 is disposed outside the display area or region 31, but there is no problem if the photo receiving element 41 is disposed in such the manner that the detection result can be obtained, same or similar to that obtained in the manner mentioned above.

Figure 6:
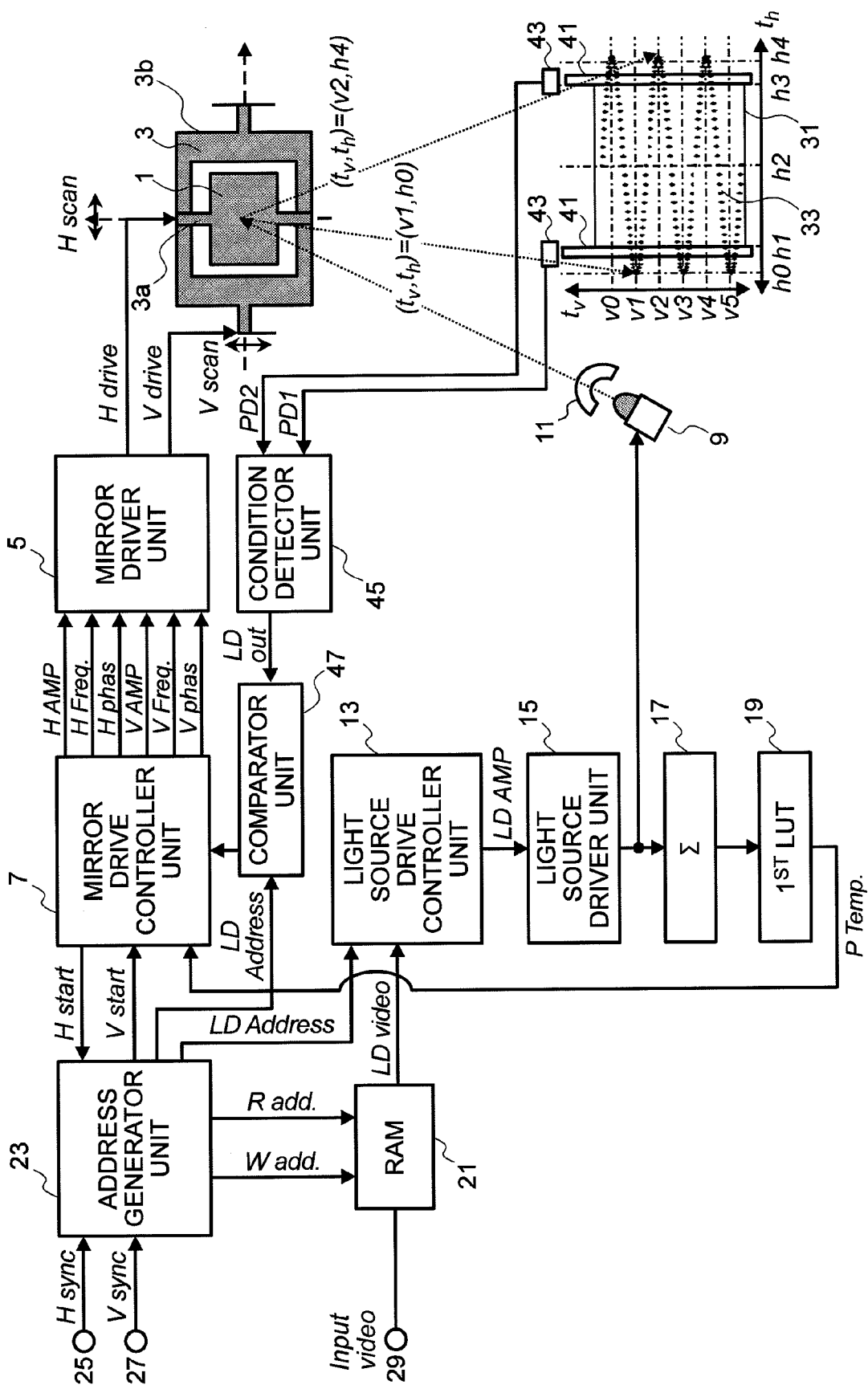
FIG. 6 is a function block diagram for showing the entire structures of an image displaying apparatus, according to a fourth embodiment of the present invention.

FIG. 6 is a function block diagram for showing the entire structures of the image displaying apparatus, according to a fourth embodiment of the present invention.

The image displaying apparatus shown in FIG. 6 differs from the image displaying apparatus shown in FIG. 4, in the structures thereof, in particular, in the following aspects; i.e., the photo receiving member 41 and the photo/eclectic converter element 43, which are shown in FIG. 4, are further disposed, in addition to the position where they are disposed, as was shown in FIG. 4, also at the position, symmetrical with that position about the center line $h_2$ of the display area 31, and that the condition detector portion 45 detects the operating condition of the micro mirror 1, upon basis of the electric signal PD1, which is outputted from the photo/eclectic converter element 43 shown at the right-hand side in FIG. 6, and the electric signal PD2, which is outputted from the photo/eclectic converter element 43 shown at the left-hand side in FIG. 6. However, since the structures shown in FIG. 6, but other than those mentioned above, are same to those shown in FIG. 4, and therefore in this FIG. 6, the same reference numerals are attached for those shown in FIG. 4, but the explanation will be omitted about the details thereof.

In such the structures mentioned above, the condition detector portion 45, as well as, measuring the distance between output timings of the above-mentioned two (2) electric signals PD1 and PD2, each being outputted, intermittently, from the photo/eclectic converter element 43 or 43, respectively, detects presence of the output of the electric signal mentioned above, thereby obtaining the vibration (or oscillation) frequency data, the vibration (or oscillation) amplitude data and the vibration (or oscillation) phase data, indicating the operating condition of the micro mirror 1, and it outputs the signal LD out, including the vibration (or oscillation) frequency data, the vibration (or oscillation) amplitude data and the vibration (or oscillation) phase data obtained in the above, to the comparator unit 47. In the comparator unit 47 are compared the signal LD out and the signal LD Address, so as to output the comparison result thereof to the mirror drive controller. The processes thereafter are almost same to those contents, which were explained by referring to FIG. 4 in the above, and therefore the explanation thereof will be omitted herein.

Figure 7:
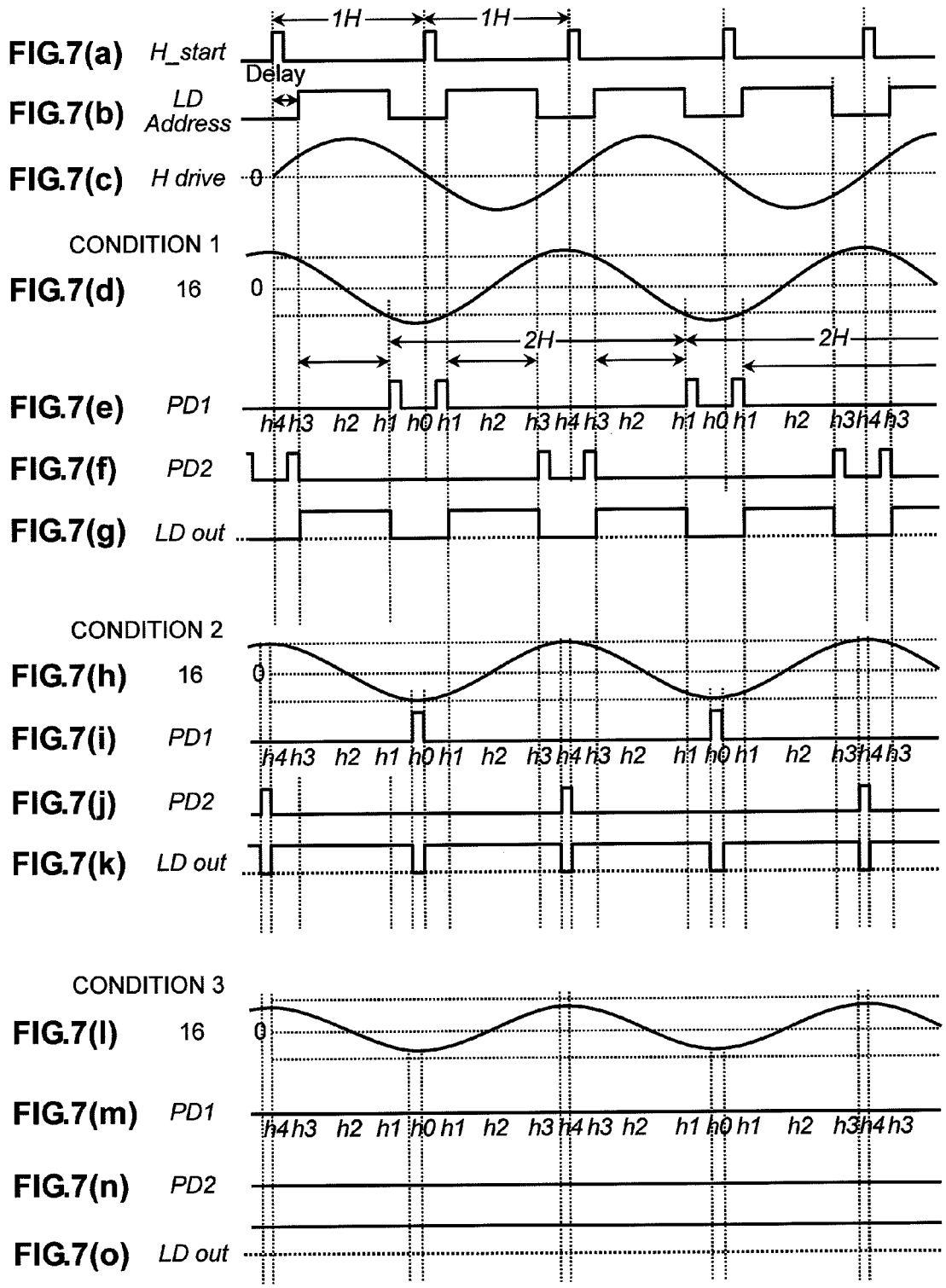
FIGS. 7(a) to 7(o) are timing chart for showing the operation of each of portions building up the image displaying apparatus shown in FIG. 6.

FIGS. 7(a) to 7(o) are timing charts for showing the operation of each of portions building up the image displaying apparatus shown in FIG. 6 mentioned above.

In FIGS. 7(a) to 7(o), in particular, FIG. 7(a) shows a waveform of a vibration horizontal direction vibration reference signal, i.e., the H start signal, FIG. 7(b) shows a waveform of a laser diode address signal, which is outputted from the address generator unit 23 to the comparator unit 47, i.e., the LD Address signal, respectively. Next, FIG. 7(c) shows a waveform of the H drive signal, which is outputted from the mirror driver unit 5 to the horizontal (H) direction driving/holding mechanism 3a of the mirror driving/holding mechanism 3 (i.e., the mirror driving signal for driving (or oscillating) the micro mirror 1 into the horizontal (H) direction).

Next, FIG. 7(d) shows a waveform of the vibration (or oscillation) of the micro mirror 1 in the horizontal (H) direction when the locus 33 of the raster scanning is in the ideal condition, as is shown by the condition 1 in FIG. 2(a), for example, and FIG. 7(e) shows a waveform of the electric signal PD1, which is outputted from one of the photo/eclectic converter elements 43 to the condition detector portion 45, when the locus 33 of the raster scanning is in the condition 1, respectively. Next, FIG. 7(f) shows a waveform of the electric signal PD2, which is outputted from the other of the photo/eclectic converter elements 43 to the condition detector portion 45, when the locus 33 of the raster scanning is in the condition 1, and FIG. 7(g) a waveform of the LD out signal, which is outputted from the condition detector portion 45 to the comparator unit 47, when the locus 33 of the raster scanning is in the condition 1, respectively.

Next, FIG. 7(h) shows a waveform of the vibration (or oscillation) of the micro mirror 1 in the horizontal (H) direction when the locus 33 of the raster scanning is in the condition 2, which is shown in FIG. 2(b), for example, and FIG. 7(i) a waveform of the electric signal PD1, which is outputted from one of the photo/eclectic converter elements 43 to the condition detector portion 45, when the locus 33 of the raster scanning is in the condition 2, respectively. Next, FIG. 7(j) shows a waveform of the electric signal PD2, which is outputted from the other of the photo/eclectic converter elements 43 to the condition detector portion 45, when the locus 33 of the raster scanning is in the condition 2, and FIG. 7(k) a waveform of the LD out signal, which is outputted from the condition detector portion 45 to the comparator unit 47, when the locus 33 of the raster scanning is in the condition 2, respectively.

Next, FIG. 7(l) shows a waveform of the vibration (or oscillation) of the micro mirror 1 in the horizontal (H) direction when the locus 33 of the raster scanning is in the condition 3, which is shown in FIG. 2(c), for example, and FIG. 7(m) a waveform of the electric signal PD1, which is outputted from one of the photo/eclectic converter elements 43 to the condition detector portion 45, when the locus 33 of the raster scanning is in the condition 3, respectively. Next, FIG. 7(n) shows a waveform of the electric signal PD2, which is outputted from the other of the photo/eclectic converter elements 43 to the condition detector portion 45, when the locus 33 of the raster scanning is in the condition 3, and FIG. 7(o) a waveform of the LD out signal, which is outputted from the condition detector portion 45 to the comparator unit 47, when the locus 33 of the raster scanning is in the condition 3, respectively.

As shown in FIG. 7(a) to 7(o), the H start signal is outputted one by one, from the mirror drive controller unit 7 to the address generator unit 23, at $h_0$ when the vibration (or oscillation) of the locus 33 of the raster scanning reaches to one end of the display area 31 and $h_4$ when it reaches to the other end of the display area 31, respectively. In other words, the H start signal is outputted from the mirror drive controller unit 7 to the address generator unit 23, every half cycle of the vibration (or oscillation) of the locus 33 of the raster scanning in the horizontal (H) direction. In FIGS. 7(a) to 7(o), the time-period from rise-up of the H start signal to rise-up of the next coming H start signal is indicated by 1H.

The LD Address signal rises up after elapsing a constant time delay from the rise-up of the H start signal. In FIGS. 7(a) to 7(o), where a first LD Address signal rises up is at the position indicated by the time $h_3$, after the position indicated by the time $h_4$ where a first H start signal rises up. Where this first LD Address signal falls down is at the position, which is indicated by the time $h_1$, after the time $h_3$. Next, where a second LD Address signal rises up is at the position indicated by the time $h_1$, after the position indicated by the time $h_0$ where a second H start signal rises up, and where this second LD Address signal falls down is at the position indicated by the time $h_3$, after the time $h_1$. Next, where a third LD Address signal rises up is at the position indicated by the time $h_3$, after the position indicated by the time $h_4$ where a third H start signal rises up, and where this third LD Address signal falls down is at the position indicated by the time $h_1$, after the time $h_3$.

Next, where a fourth LD Address signal rises up is at the position indicated by the time $h_1$, after the position indicated by the time $h_0$ where a fourth H start signal rises up, and where this fourth LD Address signal falls down is at the position indicated by the time $h_3$, after the time $h_1$. Further, where a fifth LD Address signal rises up is at the position indicated by the time $h_3$, after the position indicated by the time $h_4$ where a fifth H start signal rises up. The H drive signal is a sine-wave signal, taking the time between the rise-up of the first H start signal and the rise-up of the third H start signal or the time between the rise-up of the third H start signal and the rise-up of the fifth H start signal, as one cycle, respectively.

The waveform of the vibration (or oscillation) of the micro mirror 1 in the horizontal (H) direction shown in FIG. 7(d), as is apparent from that figure, can be also shown by the sine-wave, similar to the H drive signal, and the cycle thereof is also almost same to the cycle of the H drive signal. The waveform of the vibration (or oscillation) in the horizontal (H) direction is shifted from the H drive signal in the phase, i.e., from the time $h_2$, to the time $h_4$. In FIG. 7(e), a first PD1 signal rises up at the time $h_1$ where the first LD Address signal rises up, and a second PD1 signal falls down at the time $h_1$ where the second LD Address signal rises up. A third PD1 signal rises up at the time $h_1$ where the third LD Address signal falls down, and a fourth PD1 signal falls down at the time $h_1$ where the fourth LD Address signal rises up.

In FIG. 7(f), a first PD2 signal falls down at the time $h_3$ where the first LD Address signal rises up, and a second PD2 signal rises up at the time $h_3$ where the second LD Address signal falls down. A third PD2 signal falls down at the time $h_3$ where the third LD Address signal rises up, and a fourth PD2 signal rises up at the time $h_3$ where the fourth LD Address signal falls down. A fifth PD2 signal falls down at the time $h_3$ where the fifth LD Address signal rises up. In FIG. 7(g), a first LD out signal is in synchronism with the first LD Address signal, a second LD out signal with the second LD Address signal, a third LD out signal with the third LD Address signal, a fourth LD out signal with the fourth LD Address signal, and a fifth LD out signal with the fifth LD Address signal, respectively.

The waveform of the vibration (or oscillation) of the micro mirror 1 in the horizontal (H) direction shown in FIG. 7(h) is also in the sine-wave, being similar to the wave of the micro mirror 1 in the horizontal (H) direction shown in FIG. 7(d); however, the maximum value in the amplitude thereof is a little bit smaller than that of the waveform of the vibration (or oscillation) shown in FIG. 7(d). Regarding the phase, it is almost same to that of the waveform of the vibration (or oscillation) shown in FIG. 7(d). Regarding the PD1 signals, any one of them rises up at the time $h_0$, and also regarding the PD2 signals, at the time $h_4$. Further, regarding the LD out signals, the first, third and fifth ones rise up at the time $h_4$, and fall down at the time $h_0$, respectively, while the second and forth LD out signals rise up at the time $h_4$, and fall down at the time $h_0$, respectively.

And, the waveform of the vibration (or oscillation) of the micro mirror 1 in the horizontal (H) direction shown in FIG. 7(l) is also the sine-wave, being similar to the wave of the micro mirror 1 in the horizontal (H) direction shown in FIGS. 7(d) and 7(h); however, the maximum value in the amplitude thereof is considerably smaller than that of the waveform of the vibration (or oscillation) shown in FIG. 7(d). Regarding the phase, it is almost same to that of the waveform of the vibration (or oscillation) shown in FIGS. 7(d) and 7(h). Regarding the PD1 signals, PD2 signals, and LD out signals, any one of them is not outputted.

As was explained in the above, according to the fourth embodiment of the present invention, it is possible to adjust the driving (or oscillating) condition of the micro mirror, so as to bring it into the vibration (or oscillation) frequency, the vibration (or oscillation) amplitude and the vibration (or oscillation) phase, being appropriate much more, comparing to the third embodiment of the present invention mentioned above, and thereby enabling to drive (or oscillate) the micro mirror 1, with stability, while determining or setting up the driving (or oscillating) condition of the micro mirror 1 to be high in the accuracy thereof.

Figure 8:
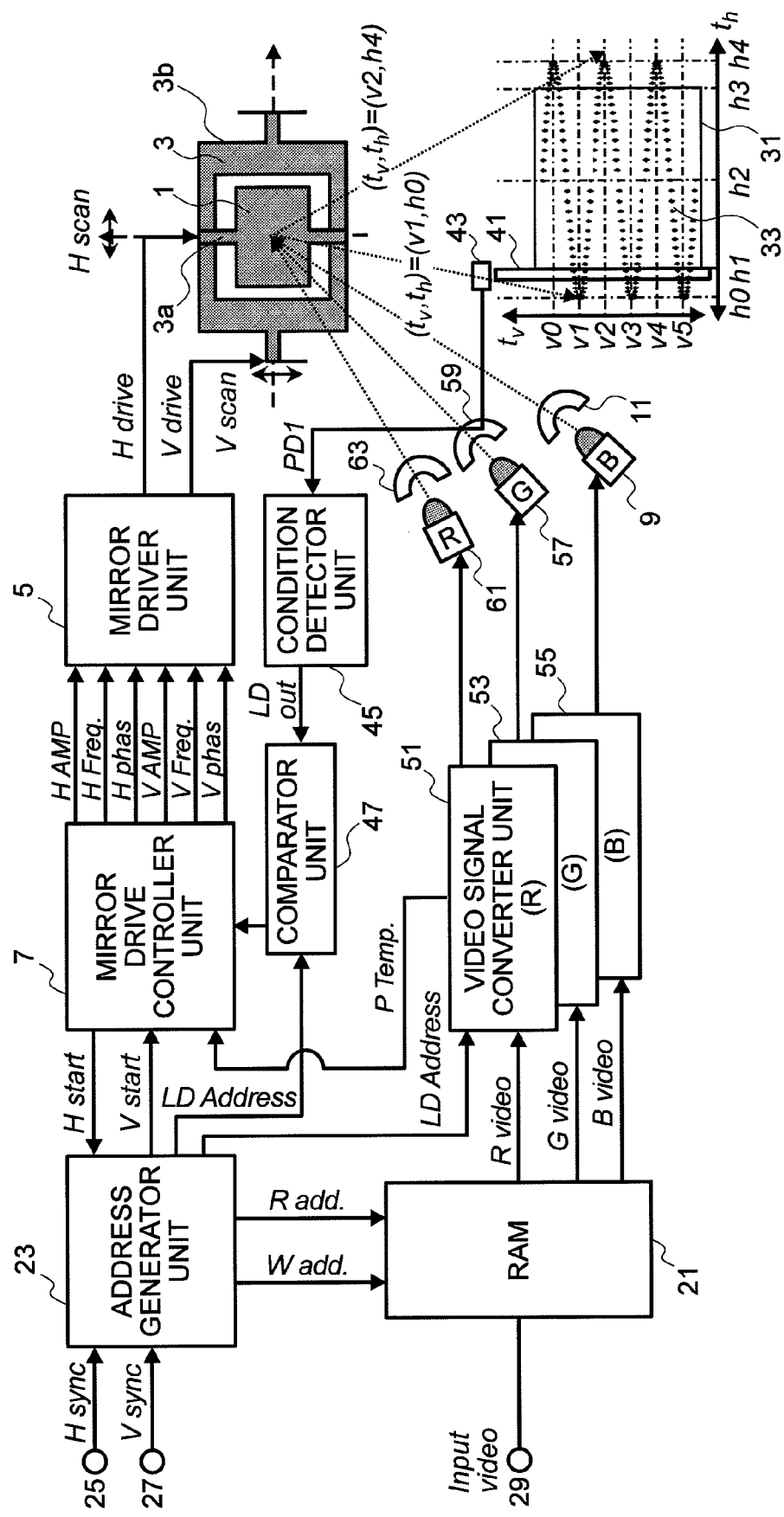
FIG. 8 is a function block diagram for showing the entire structures of an image displaying apparatus, according to a fifth embodiment of the present invention.

FIG. 8 is a function block diagram for showing the entire structures of the image displaying apparatus, according to a fifth embodiment of the present invention.

The image displaying apparatus shown in FIG. 6 differs from the image displaying apparatus shown in FIG. 4, in the structures thereof, in particular, in an aspect that, in addition to the light source shown by the reference numeral 9 and the beam light producer lens shown by the reference numeral 11 in FIG. 4, there are further provided the followings; i.e., a light source, which is shown by a reference numeral 57, a beam light producer lens, which is shown by a reference numeral 59, a light source, which is shown by a reference numeral 61, a beam light producer lens, which is shown by a reference numeral 63. In FIG. 8, the light source 9 functions as the light source for irradiating a laser light of blue color (B), and the beam light producer lens 11, receiving the laser light of the blue (B) color irradiated from the light source 9 thereupon, produces a laser beam light of the blue color; i.e., being used as the beam light producer lens, for emitting that blue color laser beam directing onto the micro mirror 1. Also, the light source 57 functions as the light source for irradiating a laser light of green color (G), and the beam light producer lens 59, receiving the laser light of the green (G) color irradiated from the light source 57 thereupon, produces a laser beam light of the green color; i.e., being used as the beam light producer lens, for emitting that green color laser beam directing onto the micro mirror 1. Further, the light source 61 functions as the light source for irradiating a laser light of red color (R), and the beam light producer lens 63, receiving the laser light of the red (R) color irradiated from the light source 61 thereupon, produces a laser beam light of the red color; i.e., being used as the beam light producer lens, for emitting that red color laser beam directing onto the micro mirror 1.

Also, in the image displaying apparatus shown in FIG. 8 are provided three (3) sets of video signal converter units, i.e., a R (red color) video signal converter unit 51, a G (green color) video signal converter unit 53 and a B (blue color) video signal converter unit 55, corresponding to the three (3) light sources 9, 57 and 61, respectively. Those video signal converter units 51, 53 and 55 are same in the structures thereof, and each includes the light source drive controller unit 13, the light source driver unit 15, the light amount integrator unit 17, and the first LUT holder unit 19, which are shown in FIG. 4. Since each unit of those was already mentioned, previously, in the details thereof, duplication of explanation thereof will be omitted. In this FIG. 8, the R video signal converter unit 51 controls the driving of the light source 61 (i.e., irradiating the red color laser light), the G video signal converter unit 53 the driving of the light source 57 (i.e., irradiating the green color laser light), and the B video signal converter unit 55 the driving of the light source 9 (i.e., irradiating the blue color laser light), respectively. However, since the structures shown herein, but other than those mentioned above, are same to those shown in FIG. 4, and therefore in this FIG. 8, the same reference numerals are attached for those shown in FIG. 4, but the explanation will be omitted about the details thereof.

In the structures mentioned above, the R video signal converter unit 51 inputs the LD Address from the address generator unit 23, and a kind of the LD video from the RAM 21, i.e., R video, respectively. That R video includes therein bright/dark information relating to a red color (R) video signal (i.e., information indicating brightness for each pixel in relation with the red color (R) video signal). The R video signal converter unit 51 obtains an amplification factor fitting to the LD Address, so as to amplify the R video at that amplification factor obtained, and thereby producing the LD AMP, i.e., the signal for driving the light source 61, and at the same time, it also drives the light source 61 with that LD AMP produced. With this, the light amount of the red color laser light irradiated from the light source 61 can be modulated. The G video signal converter unit 53, similar to that within the R video signal converter unit 51, also inputs the LD Address from the address generator unit 23, and G video, respectively. That G video includes therein bright/dark information relating to a green color (G) video signal (i.e., information indicating brightness for each pixel in relation with the green color (G) video signal). The G video signal converter unit 53 obtains an amplification factor fitting to the LD Address, so as to amplify the G video at that amplification factor obtained, and thereby producing the LD AMP, i.e., the signal for driving the light source 57, and at the same time, it also drives the light source 61 with that LD AMP produced. With this, the light amount of the green color laser light irradiated from the light source 57 can be modulated. Also, the B video signal converter unit 55, similar to that within the G video signal converter unit 53 and/or the R video signal converter unit 51, inputs the LD Address from the address generator unit 23, and B video, respectively. That B video includes therein bright/dark information relating to the blue color (B) video signal (i.e., information indicating brightness for each pixel in relation with the blue color (B) video signal). The B video signal converter unit 55 obtains an amplification factor fitting to the LD Address, so as to amplify the B video at that amplification factor obtained, and thereby producing the LD AMP, i.e., the signal for driving the light source 9, and at the same time, it also drives the light source 9 with that LD AMP produced. With this, the light amount of the blue color laser light irradiated from the light source 9 can be modulated.

The R video signal converter unit 51, the G video signal converter unit 53, or the B video signal converter unit 55, in parallel with the processing operation mentioned above, produces and stores therein, respectively, a histogram of an amount of light emission per a unit of a reference time, i.e., the history data of the past, for showing a manner of the temperature distribution on the micro mirror 1 and/or a manner of changes of the temperature on the micro mirror 1. And, it outputs the above-mentioned history data of the past stored therein to the mirror drive controller unit 7, responding to the request of data readout from the mirror drive controller unit 7. The mirror drive controller unit 7 presumes what the temperature is on the micro mirror 1 at the present time, upon basis of the history data, and sets that temperature of the micro mirror 1 presumed, as the temperature P temp on the micro mirror 1 at the present time. The following steps of processing are as mentioned previously.

Figure 9:
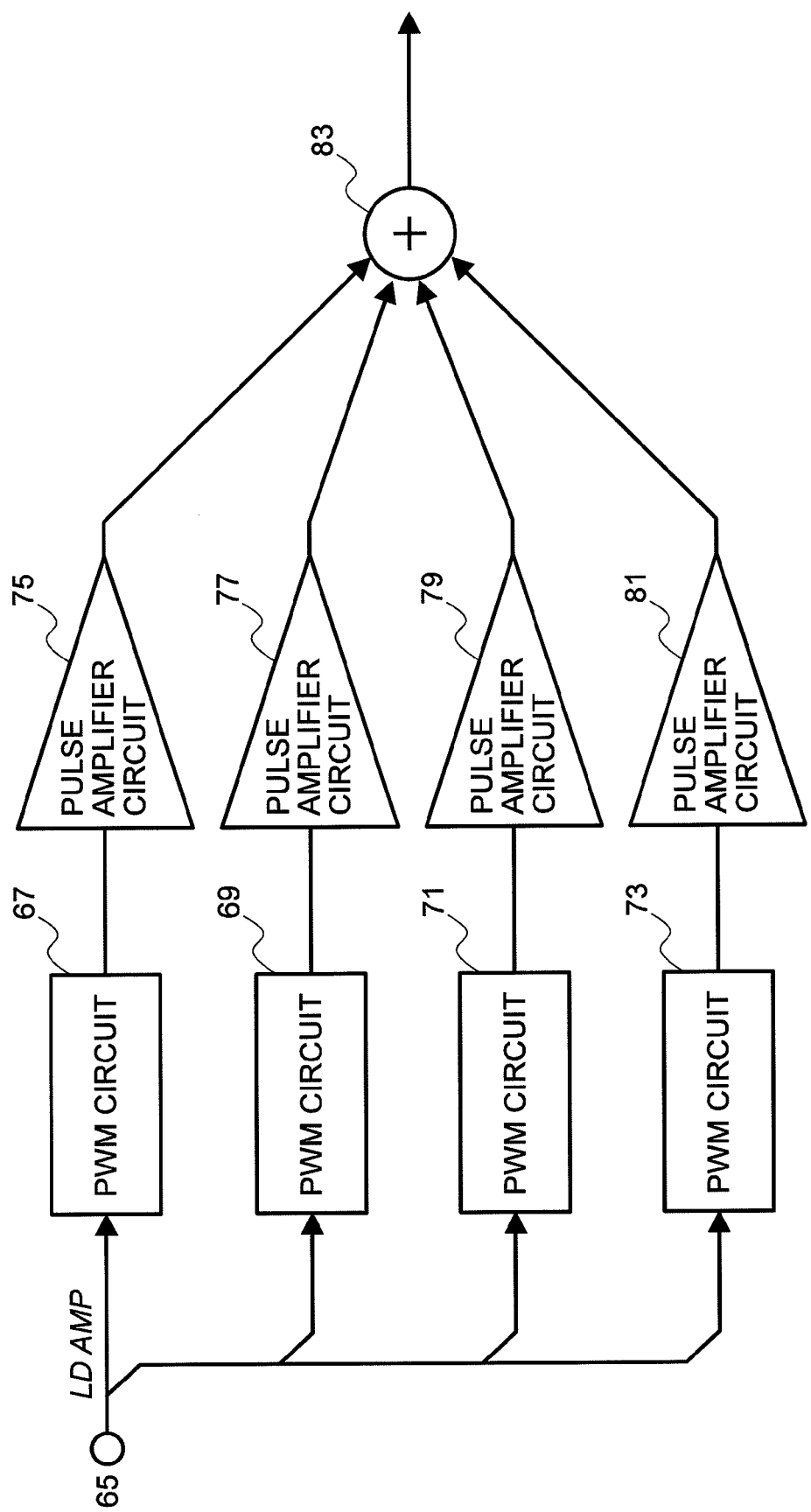
FIG. 9 is a function block diagram for showing the inner structures of a light source driver portion, being included in each of an R video signal converter portion, a G video signal converter portion and a B video signal converter portion, respectively, which are shown in FIG. 8.

FIG. 9 is a function block diagram for showing the internal structures of the light source driver unit 15 (shown in FIG. 1, FIG. 3, FIG. 4 and FIG. 6), which is included in any one of the R video signal converter unit 51, the G video signal converter unit 53 and the B video signal converter unit 55 shown in FIG. 8.

The light source driver unit 15 mentioned above comprises therein, as shown in FIG. 9, four (4) sets of PWM (i.e., Pulse Width Modulation) circuit 67, 69, 71 and 73, four (4) sets of pulse amplifier circuits 75, 77, 79 and 81, and an adder 83. Inputs of those PWM circuits 67, 69, 71 and 73 are connected with the output terminal 65 of the light source drive controller unit 13 (shown in FIG. 1, FIG. 3, FIG. 4 and FIG. 6), respectively. Thus, any one of the four (4) sets of PWM circuits 67, 69, 71 and 73 is connected with the output terminal 65 of the light source drive controller unit 13, in parallel with one another. The pulse amplifier circuit 75 is connected with an output of the PWM circuit 67, the pulse amplifier circuit 77 with an output of the PWM circuit 69, the pulse amplifier circuit 79 is connected with an output of the PWM circuit 71, and the pulse amplifier circuit 81 with an output of the PWM circuit 73, respectively. An input of the adder 83 is connected with outputs of the pulse amplifier circuits 75, 77, 79 and 81.

The PWM circuits 67, 69, 71 and 73 input two (2) bits of the signal PL AMP of eight (8) bits, by each, which is inputted from the light source drive controller unit 13 through the output terminal 65, and treat pulse width modulation on the above-mentioned two (2) bits signal inputted, upon basis of the bright/dark information for each pixel of the original video data, which is indicated by each of the two (2) bits signal inputted. (Thus, an adjustments is made upon ON-time widths of the inputted signal LD AMP (i.e., the pulse signal), indicating the time-period of displaying one (1) pixel within the video data to be displayed on the display area 31 (i.e., the time widths of light emissions of the light sources (9, 57 and 61)).) With this, on the display area 31 mentioned previously, a projection image of the original video data is displayed, the brightness of which is ranked within the region of 256 gradations for each pixel.

The pulse amplifier circuits 75, 77, 79 and 81 input the two (2) bits signals (i.e., the pulse signals), after being adjusted upon the ON-time width thereof, which are outputted from the corresponding PWM circuits 67, 69, 71 and 73, respectively, and amplify waveforms of the ON-time width of those two (2) bits signals (i.e., the pulse signals). And, they output the signals after that (pulse) amplification, to the adder 83, respectively.

The adder 83 adds the (pulse) signals after being treated with the pulse amplification, which are outputted from the pulse amplifier circuits 75, 77, 79 and 81, respectively. With this, a light source driver signals is produced, which indicates a specific one gradation within the 256 gradations, for a certain pixel within the original video data. The adder 83 outputs that light source driver signal to the light sources (9, 57 and 61).

As was explained in the above, according to the fifth embodiment of the present invention, even if increasing the output energy from the light source (i.e., the light emission amount from the light source), for achieving the high brightness of the projection image, it is possible to bring the irradiation timings of the laser lights from the light sources (9, 57 and 59), for displaying the projection image on the display area 31, to be synchronized with the oscillations of the micro mirror 1 in the horizontal (H) direction and the vertical (V) direction, by means of the mirror driving/holding mechanism 3, at high accuracy, and thereby enabling prevention of ill effects from generating within the structures of the micro mirror 1, also prevention of ill influences from being exerted upon the driving (or oscillating) condition of the micro mirror 1, and further enabling the video or image display with stability.

Also, upon basis of the electric signal PD1 outputted from the photo/eclectic converter elements 43, intermittently, the position on the display area 31 is determined, corresponding to the time-period from starting display of the projection image until finishing the display thereof on the display area 31, every time when the micro mirror 1 oscillates in the horizontal (H) direction and the vertical (V) direction, and with this, the display position of the projection image can be fixed on the display area 31, even under the condition where the oscillation of the micro mirror 1 changes in width thereof, and therefore it is possible to reproduce the original video data under a stable condition.

Also, when displaying the original video data on the display area 31, under the condition of oscillating the micro mirror 1 in the horizontal (H) direction and the vertical (V) direction, it is possible to adjust the intensity of the laser lights to be irradiated from the light sources (9, 57 and 61), in a step-like manner, thereby enabling to achieve bright/dark gradation display with high accuracy. Also, adding the signals, which are outputted from the plural number of pulse amplifier circuits (75, 77, 79 and 81), respectively, within the adder 83, enables to increase the number of gradations, with ease, for the purpose of enabling to express the degree of brightness/darkness for each of pixels building up the original video data, finely, without increasing processing speed within the circuit operations. Further, by determining an overlap of the laser beam light between the pixels themselves, neighboring to each other in the oscillation direction of the micro mirror 1, for each of the gradations, it is also possible to conduct a control on definitions (i.e., an extension of a pixel) for each of the pixels, with ease.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:

1. An image displaying apparatus, comprising:
    a reflection mirror, which is configured to display an image on a projection object, and configured to reflect a light into a predetermined direction upon receiving said light irradiated from a light source;
    a reflection mirror vibrating mechanism, which is configured to vibrate said reflection mirror into a predetermined direction;
    a light amount integrator unit, which is configured to obtain an integration result indicating a total light amount from said light source per a unit of time;
    a temperature presuming unit, which is configured to presume a temperature on said reflection mirror, depending on said integration result of said light amount integrator unit; and
    a vibration condition adjusting unit, which is configured to adjust a condition of the vibration of said reflection mirror by said reflection mirror vibrating mechanism, to be corresponding to the temperature on said reflection mirror, which is presumed to be within said temperature presuming unit.

2. The image displaying apparatus, as is described in the claim 1, wherein said reflection mirror vibrating mechanism comprises:
    a first vibration mechanism, which is configured to vibrate said reflection mirror in a first axial direction; and
    a second vibration mechanism, which is configured to vibrate said reflection mirror in a second axial direction, perpendicular to said first axial direction.

3. The image displaying apparatus, as is described in the claim 1, wherein said temperature presuming unit presumes the temperature on said reflection mirror, upon basis of accumulated value data of a light amount irradiated from said light source, per every predetermined time-period.

4. The image displaying apparatus, as is described in the claim 3, wherein said vibration condition adjusting unit executes an adjustment of at least one of vibration amplitude, vibration frequency, and vibration phase of said reflection mirror by said reflection mirror vibrating mechanism, to be corresponding to the temperature on said reflection mirror, which is presumed within said temperature presuming unit.

5. The image displaying apparatus, as is described in the claim 4, wherein the adjustment upon the vibration condition of said reflection mirror, which is conducted by said vibration condition adjusting unit, is conducted such that a locus of the light reflected through said reflection mirror on said projection object is in conformity with an ideal condition of the locus of said light on said projection object.

6. An image displaying apparatus, comprising:
   a reflection mirror, which is configured to display an image on a projection object, and configured to reflect a light into a predetermined direction upon receiving said light irradiated from a light source;
   a reflection mirror vibrating mechanism, which is configured to vibrate said reflection mirror into a predetermined direction;
   a light amount integrator unit, which is configured to obtain an integration result indicating a total light amount from said light source per a unit of time;
   a photo detector unit, which is configured to output a predetermined electric signal, after detecting a light incident upon said projection object through said reflection mirror;
   a temperature presuming unit, which is configured to presume temperature on said reflection mirror, depending on said integration result of said light amount integrator unit;
   a vibration condition detector unit, which is configured to detect a vibration condition of said reflection mirror, upon basis of the electric signal outputted from said photo detector unit; and
   a controller unit, which is configured to control said reflection mirror vibrating mechanism, so as to bring the vibration condition of said reflection mirror into a desired vibration condition, upon basis of the temperature of said reflection mirror, which is assumed by said temperature presuming unit, and the vibration condition of said reflection mirror, which is detected by said vibration condition detector unit.

7. The image displaying apparatus, as described in the claim 6, wherein said vibration condition detector unit detects at least one of vibration amplitude, vibration frequency, and vibration phase of said reflection mirror, which are obtained by measuring a distance between the electric signals outputted from said photo detector unit.

8. The image displaying apparatus, as described in the claim 6, wherein said photo detector unit comprises:
   a photo transmitting member, which is disposed in said projection object and is configured to transmit a light incident thereupon; and
   a photo/electric converter element, which is configured to input the light transmitted through said photo transmitting member, so as to output a predetermined electric signal therefrom.

9. The image displaying apparatus, as described in the claim 6, wherein said photo detector units are disposed within said projection object, in plural number of sets thereof.

10. The image displaying apparatus, as described in the claim 9, wherein said light source includes therein:
    a red color light source for irradiating a red color light towards said reflection mirror;
    a green color light source for irradiating a green color light towards said reflection mirror; and
    a blue color light source for irradiating a blue color light towards said reflection mirror.

11. A method for adjusting vibration condition of a reflection mirror, within an image displaying apparatus, having:
    a reflection mirror, which is configured to display an image on a projection object, and configured to reflect a light into a predetermined direction upon receiving said light irradiated from a light source; and
    a reflection mirror vibrating mechanism, which is configured to vibrate said reflection mirror into a predetermined direction, comprising the following steps of:
    a first step for obtaining an integration result from a light amount integrator unit, indicating a total light amount of said light source per a unit of time;
    a second step for presuming temperature on said reflection mirror, depending on the integration result from said light amount integrator unit; and
    a third step for adjusting vibration condition of said reflection mirror by said reflection vibration mechanism, so as to fit the temperature on said reflection mirror, which is presumed in said second step.

12. The method for adjusting vibration condition of a reflection mirror, within an image displaying apparatus, as is described in the claim 11,
    wherein a temperature presuming unit presumes the temperature on said reflection mirror, upon basis of accumulated value data of a light amount irradiated from said light source, per every predetermined time-period.

13. A method for adjusting vibration condition of a reflection mirror, within an image displaying apparatus, as is described in the claim 12,
    wherein a vibration condition adjusting unit executes an adjustment of at least one of vibration amplitude, vibration frequency, and vibration phase of said reflection mirror by said reflection mirror vibrating mechanism, to be corresponding to the temperature on said reflection mirror, which is presumed within said temperature presuming unit.

14. A method for adjusting vibration condition of a reflection mirror, within an image displaying apparatus, as is described in the claim 13,
    wherein the adjustment upon the vibration condition of said reflection mirror, which is conducted by said vibration condition adjusting unit, is conducted such that a locus of the light reflected through said reflection mirror on said projection object is in conformity with an ideal condition of the locus of said light on said projection object.

* * * * *